United States Patent [19]

London

[11] Patent Number: 5,795,610
[45] Date of Patent: *Aug. 18, 1998

[54] FOOD MOLDING APPARATUS AND METHOD OF FORMING FOOD PRODUCTS

[75] Inventor: Eugene J. London, Sandusky, Ohio

[73] Assignee: Stein, Inc., Sandusky, Ohio

[*] Notice: The term of this patent shall not extend beyond the expiration date of Pat. No. 5,618,572.

[21] Appl. No.: 642,507

[22] Filed: May 3, 1996

Related U.S. Application Data

[63] Continuation-in-part of Ser. No. 500,305, Jul. 10, 1995, Pat. No. 5,618,571.
[51] Int. Cl.$^6$ .................... A22C 7/00; A23P 1/00
[52] U.S. Cl. ............... 426/512; 425/405.1; 425/556; 425/575; 426/513
[58] Field of Search ...................... 426/512, 513; 425/227, 357, 405.1, 556, 572, 575, 238

[56] References Cited

U.S. PATENT DOCUMENTS

| | | | |
|---|---|---|---|
| 2,820,247 | 1/1958 | Michaud | 425/382 R |
| 2,852,809 | 9/1958 | Miles et al. | 425/227 |
| 3,535,735 | 10/1970 | Egee | 425/382 R |
| 4,118,169 | 10/1978 | Haluska | 425/583 |
| 4,272,864 | 6/1981 | Holly | 426/513 |
| 4,276,318 | 6/1981 | Orlowski et al. | 426/513 |
| 4,516,291 | 5/1985 | Goldberger et al. | 426/513 |
| 4,975,039 | 12/1990 | Dare et al. | 425/238 |
| 5,145,690 | 9/1992 | Riubrugent | 426/513 |

Primary Examiner—George Yeung
Attorney, Agent, or Firm—Oldham & Oldham Co., L.P.A.

[57] ABSTRACT

The invention provides a molding apparatus and process of molding formable materials which comprises at least one supply manifold for receiving a formable material and plungers or pistons for applying pressure to the formable material within the manifold. A mold plate including at least one mold cavity is driven between fill and discharge positions, with the at least one mold cavity selectively exposed to the supply manifold when in the fill position. A clamp member is positioned adjacent the mold plate when in the fill position, and pressure is applied on the clamp member to clamp the mold plate against the supply manifold. The clamp member and associated structure apply pressure to the clamp member compensating for deflection of these structural members which maintains the mold plate in firm clamping relation relative to the supply manifold. The arrangement eliminates the need to provide the clamp plate with a thick cross section or heavy mass which would accommodate forces normally encountered during filling of the mold cavities. In this manner a mold plate having a relatively thin section, and a clamp member also of relatively thin section may be utilized, to allow a machine having significantly increased width to be realized. The significantly increased width of the machine will correspondingly increase capacity, and also allows compatibility with other processing equipment. A mold plate knife assembly is used to cut the formable material at a position adjacent the mold cavities subsequent to filling to facilitate formation of precise portions of the formable material, and also functions to seal off the supply manifold prior to movement of the mold plate to provide distinct advantages.

20 Claims, 14 Drawing Sheets

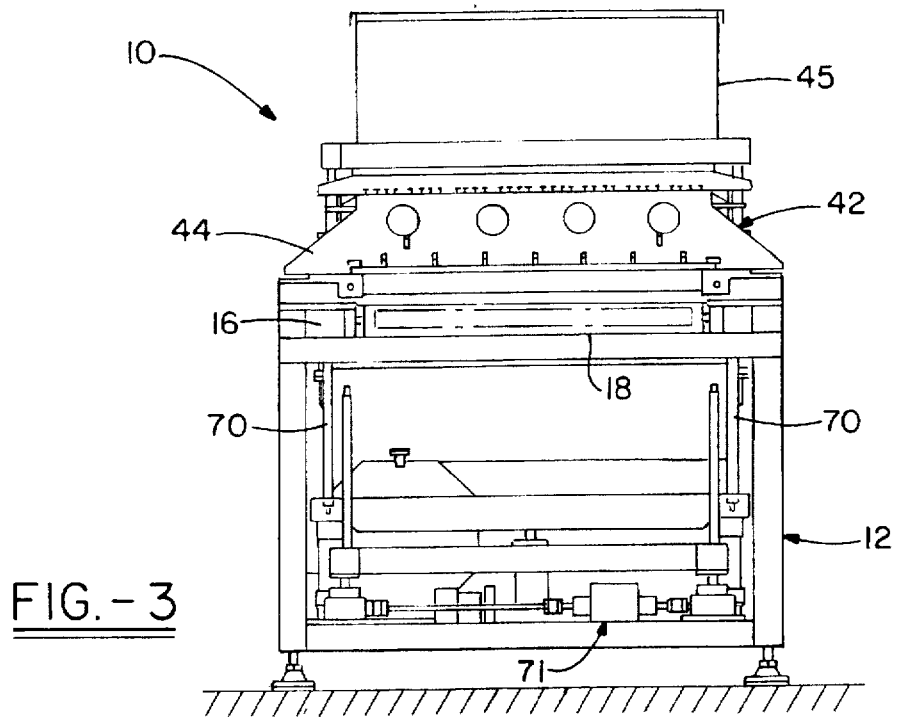
FIG.-3
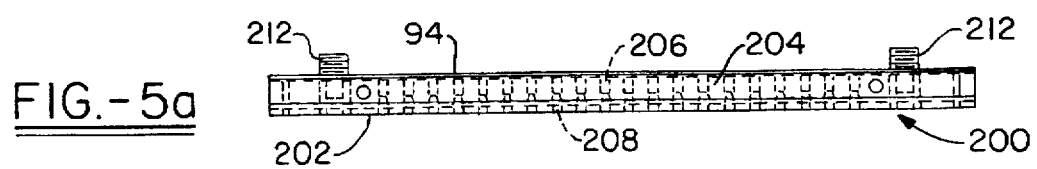
FIG.-5a
FIG.-5b
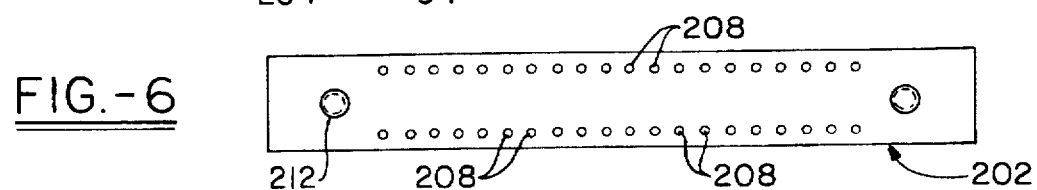
FIG.-6
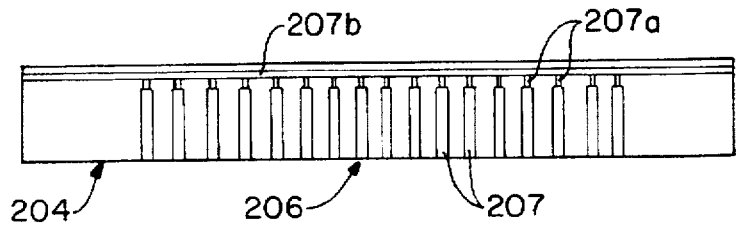
FIG.-7

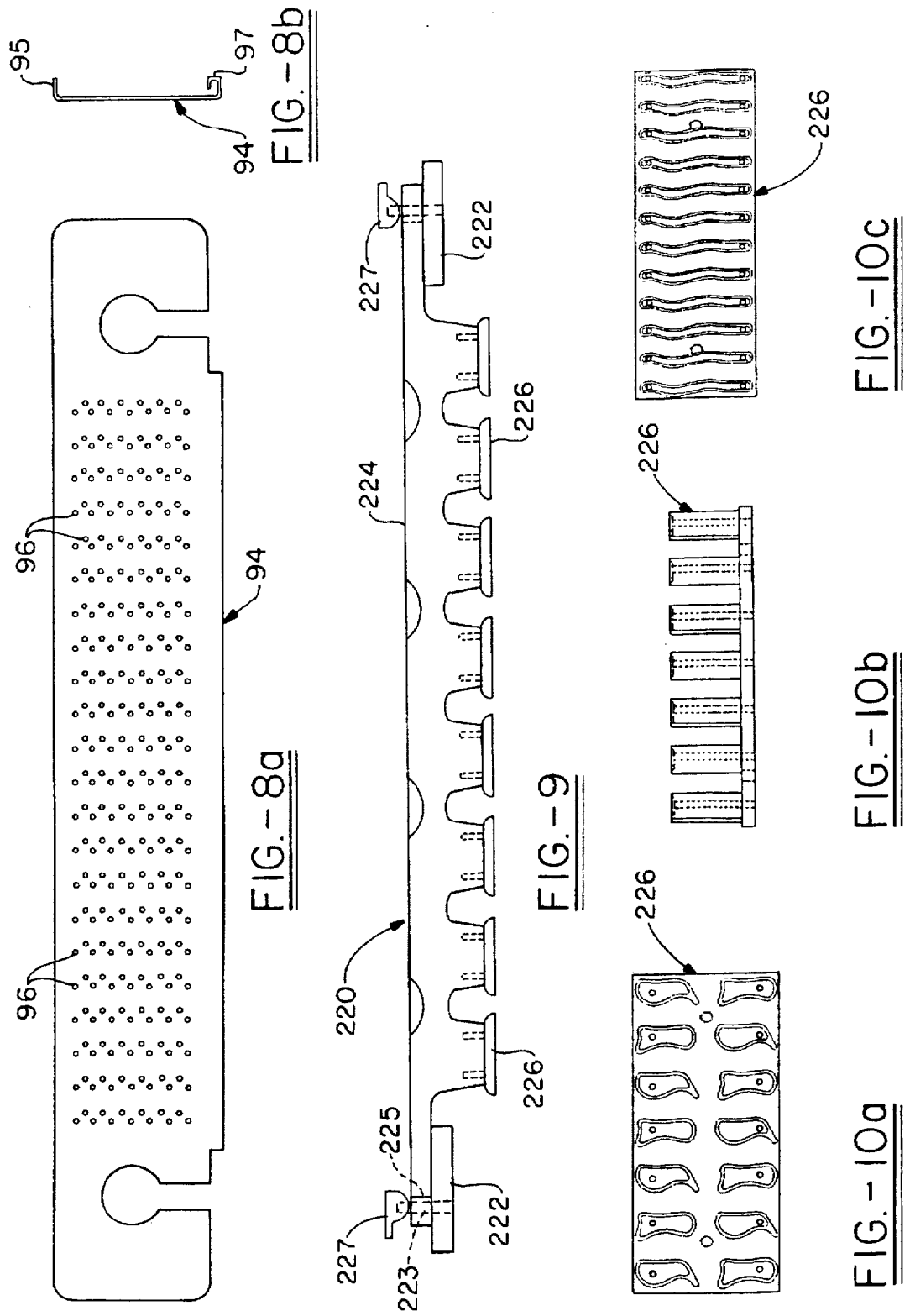

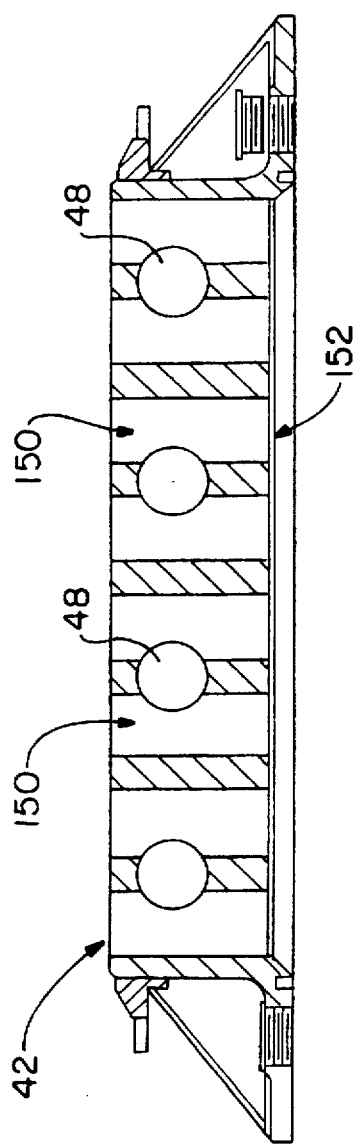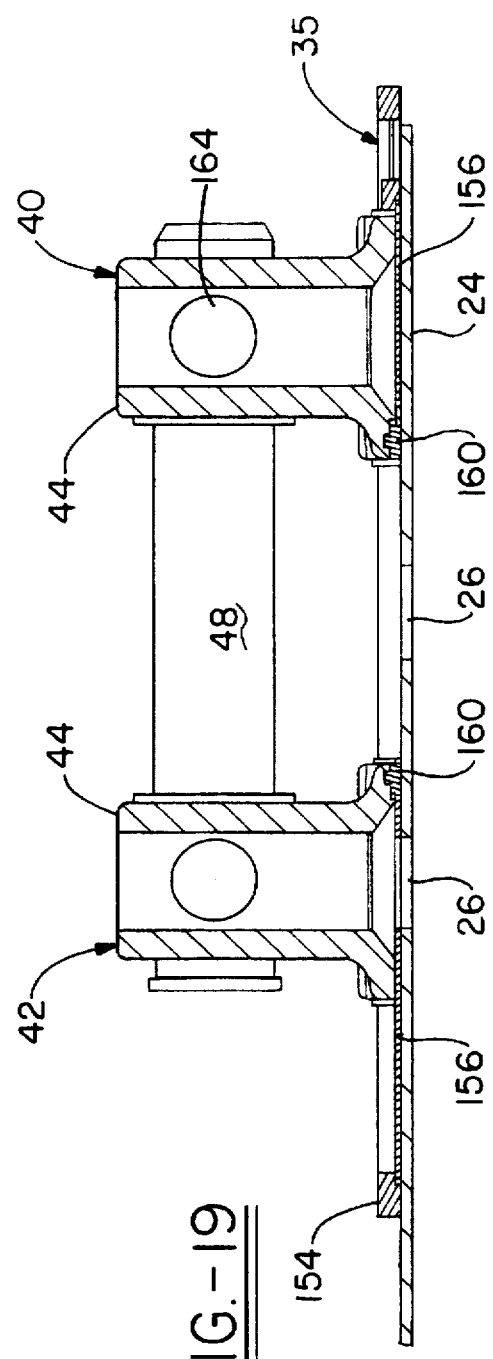

FOOD MOLDING APPARATUS AND METHOD OF FORMING FOOD PRODUCTS

CROSS-REFERENCE TO RELATED APPLICATION

This application is a continuation-in-part of application Ser. No. 08/500,305 filed Jul. 10, 1995, now U.S. Pat. No. 5,618,571.

BACKGROUND OF THE INVENTION

This invention generally relates to an apparatus for molding formable materials and its method of operation. More particularly, the invention relates to a food molding apparatus and method of forming food products wherein precise portions of a formable material are produced in a desired shape, with the machine allowing increased capacity by enabling the width of the machine to be increased significantly.

In the area of large scale food processing, forming food products of formable materials such as ground beef, whole muscle chicken products, dough or other food mixtures, is critical to further processing procedures, such as cooking or frying of large volumes of food products. Fast food chains are well known for the use of these types of products, which are also utilized by restaurants and individual consumers. In the automated production of molded and portioned food products, high-speed machinery is used to form a patty or similar product. Particular problems in such machinery have been found in attempting to increase production efficiency while providing uniform product shapes and weights.

In known food forming machines, a food supply hopper is charged with an amount of ground beef or the like, which is forced under high pressure through one or more discharge openings or slots formed in the supply hopper. A mold plate having mold cavities corresponding to the discharge openings in the supply hopper is moved between a fill position where the formable food product is forced into the cavities under pressure, and a knock out position where the contents of the cavity are removed or knocked out. This cycle is repeated as quickly as possible to increase capacity of the machine. In many such machines, an end feed conveyor system is positioned relative to the knock out position of the mold plate to receive the molded food products and transport them for further processing.

Substantial limitations in the known molding machines have been found, based upon the structural integrity of the mold plate and supply hopper, which are critical due to the high pressures used to fill the mold cavities in the mold plate. Deflection of the mold plate, the support structure for the mold plate and/or the supply hopper can create leakage of the formable material, causing significant problems in producing uniform formed products of precise weight and shape. Such leakage of the formable material also results in significant operational problems in use of the machine. Preventing deflection of the members has required heavy-duty construction, and has limited the widths of these members in the machine. In addition, the thicknesses of the members are limited due to limitations regarding how far a product can be dropped from the cavity of the mold plate onto a conveyor for example. A conveyor system has to be spaced from the machine a distance to accommodate any food product carried thereby, limiting the total thickness of the supporting structure of the mold plate and therefore imposing limitations on the width to prevent deflection of these members. Known high-speed molding machines are therefore significantly limited in terms of conveyor belt width, corresponding to the width of the mold plate and supporting structure. These same aspects therefore limit the number of cavities which can be formed in the mold plate across its width, and therefore limit the capacity of such machines.

Another significant problem in conventional food forming apparatus is found in that the pressure applied to the food product to fill the mold cavities of the mold plate is normally applied while the mold plate is moving from the fill to knock out positions. To increase speed of operation, continuous movement of the mold plate or only short duration stoppage for ejecting product from the mold cavities is common. Movement of the mold plate under filling pressure causes leakage of the food product. Additionally, the continuous application of filling pressure causes shearing of the food material as it is forced through an increasingly small slot or orifice as the mold plate is moved from a fill position, further damaging the material. With food products for example, these forces on the product within the supply hopper and relative to the mold plate may cause significant degradation of the food product. This is particularly the case with chicken products, where the whole muscle quality of the meat should be maintained.

In addition to the limitations described above, known forming machines generally do not have the ability to utilize a flow-through type of conveyor system, limiting their use with respect to other processing equipment, as well as limiting their use as a forming machine. It would therefore be desirable to provide a forming machine to overcome these limitations to increase capacity of the machine, while handling the formable material gently so as to maintain the integrity of the material.

SUMMARY OF THE INVENTION

The molding apparatus and method of molding formable materials in accordance with the invention overcomes the deficiencies of the prior art, having as an objective to significantly increase output capacity of the machine for high volume food processing.

A further object of the invention is to provide a food molding apparatus and method of forming food products which significantly reduces damage to the formable material during molding.

Another object of the invention is to provide a molding apparatus which allows the width of the mold plate and correspondingly of a conveyor system to be significantly increased thereby increasing capacity, and to allow compatibility with other processing equipment.

It is also an object of the invention to provide a mold plate which may be moved between fill and discharge positions more quickly and at speeds independent of the overall cycle rate, to accommodate slow cycle rates as well as extremely fast cycle rates.

These and other objects of the invention are generally achieved by means of a molding apparatus for processing formable materials which comprises a supply manifold for receiving a formable material and means for applying pressure to the formable material within the manifold. A mold plate having opposed first and second surfaces and including at least one mold cavity is provided, and a mold plate drive moves the mold plate between fill and discharge positions. The first surface of the mold plate is disposed adjacent to the manifold when in the fill position, such that the at least one cavity is selectively exposed to the formable material in the manifold for filling. A clamp member is positioned adjacent the second surface of the mold plate when in the fill position, and means are provided to apply pressure on the clamp member over the second surface to clamp the mold plate against the supply manifold. A pumping mechanism is used to selectively apply pressure on the formable material in the manifold to gently fill the at least one mold cavity. A knock out mechanism selectively removes the product from the filled mold cavity of the mold plate when in the discharge position. Also associated with the molding apparatus are a mold plate knife and an associated mold plate knife drive mechanism which moves the mold plate knife in relation to movement of the mold plate during fill and discharge operations. The mold plate knife is designed to cleanly cut food product at a position adjacent the first surface of the mold plate after the food product has been introduced into the at least one mold cavity provided in the mold plate. The mold plate knife further seals off the supply manifold after filling of the at least one mold cavity to allow movement of the mold plate to the discharged position without degradation of the food product within the mold cavity and thereby relieving most shearing forces on material within the at least one mold cavity during movement of the mold plate.

The invention also provides a method of forming molded food products including the steps of supplying a formable material into a supply manifold of a molding apparatus. A mold plate having at least one mold cavity is selectively positioned so the at least one mold cavity is selectively exposed to the formable material within the supply manifold. A clamp member is positioned adjacent the mold plate, and pressure is applied on the clamp member to substantially prevent deflection of the mold plate from a clamped position relative to the supply manifold. Pressure is then applied to the formable material within the supply manifold to urge the material into the at least one mold cavity while the mold plate is in the fill position. Subsequent to filling of the at least one mold cavity, a mold plate knife cuts food material at a position directly above the mold plate to seal the at least one mold cavity as well as the supply manifold. Pressure on the clamp member may then be released, and the mold plate is selectively moved to a discharge position for removal of the formable material from the at least one cavity.

BRIEF DESCRIPTION OF THE DRAWINGS

The objects and advantages of the invention will be more clearly understood by reading the following detailed description of the preferred embodiment, in conjunction with the drawings, wherein:

FIG. 3 is an end elevational view of the molding apparatus as shown in FIG. 1;

FIGS. 5a and 5b show side elevational and top views of the assembly shown in FIG. 4;

FIG. 6 shows a top view of the reactor plate in the assembly of FIG. 5;

FIG. 7 shows a top view of the clamp plate in the assembly of FIG. 5;

FIGS. 8a and 8b show top and side views of the vent plate which may be used in the assembly of FIG. 5;

FIG. 9 is a side view of a knock out assembly in a preferred embodiment of the invention;

FIGS. 10a, 10b and 10c show various embodiments of knock out blocks which may be used with the knock out bar shown in FIG. 9;

FIG. 18 is a cross-sectional view along line C—C of FIG. 17 showing the supply manifold;

FIG. 19 shows a partial cross-sectional view of the supply manifolds, mold plate knife assembly and mold plate taken along line D—D of FIG. 17;

DETAILED DESCRIPTION OF THE INVENTION

Figure 1:
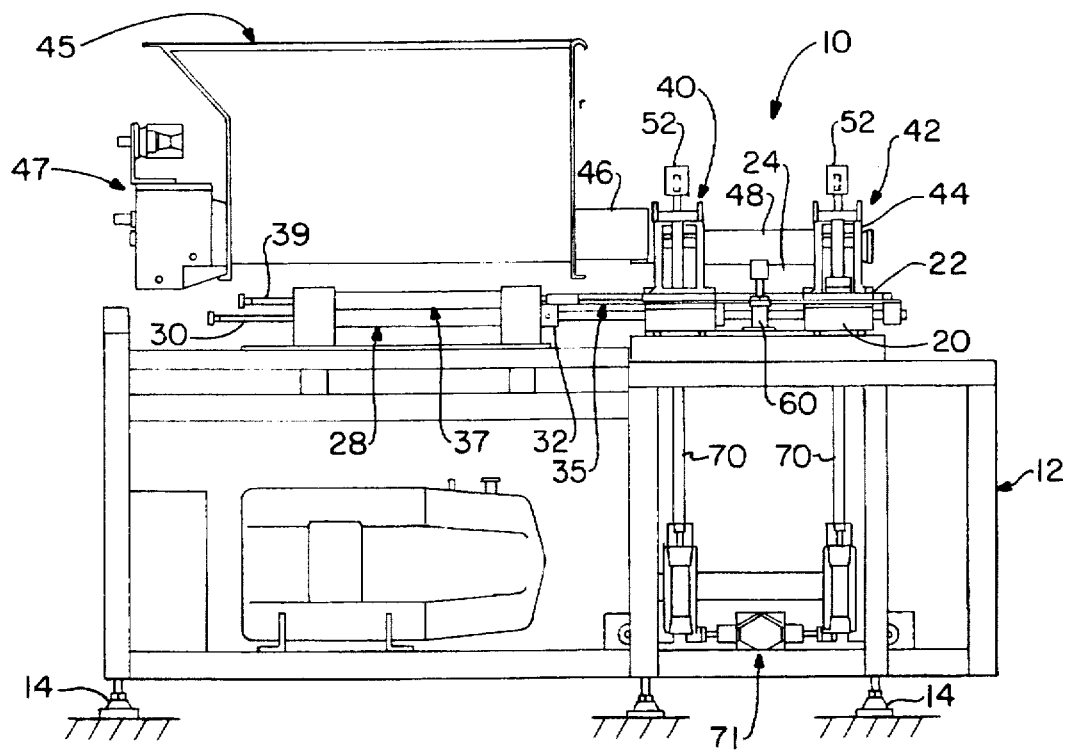
FIG. 1 is a front elevational view of the molding apparatus in a preferred embodiment of the invention.
Figure 2:
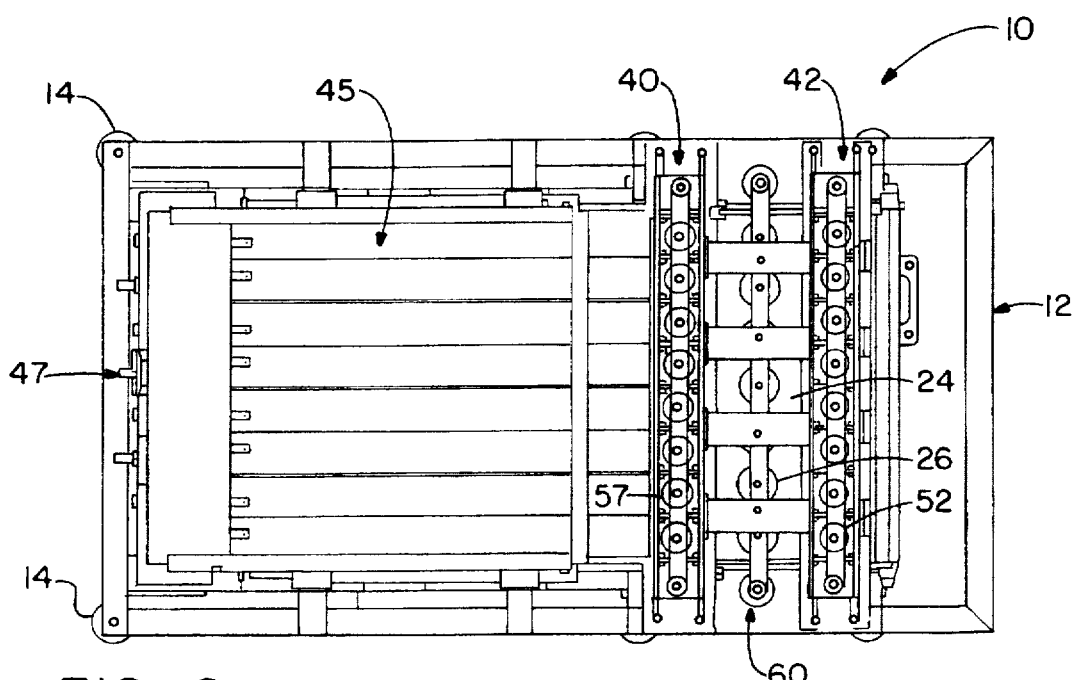
FIG. 2 is a top view of the molding apparatus of FIG. 1.

The molding apparatus of the present invention and the method of forming moldable materials of the invention will be described with reference to preferred embodiments thereof, with it being generally recognized that the invention is not to be limited to the preferred embodiments. Turning to FIGS. 1–3, the molding apparatus 10 generally includes a housing 12 which may be mounted on floor supports 14 for positioning of apparatus 10 on any suitable surface. Alternatively, a plurality of casters or the like may be mounted on the housing 12 for simplifying portability of apparatus 10. The molding machine 10 can be used for producing precise food portions of a formable food product in any desired shape, with the portions being of uniform size and weight. The apparatus 10 may be used for producing hamburger or chicken patties, bread dough, meat pies, or a variety of other food products, as well as for molding other formable materials. As seen in FIG. 3, a conveyor belt 16 may extend through an access port 18 formed in housing 12, on either one or both sides of the apparatus 10. The conveyor 16 may therefore be of a flow-through type, such as endless conveyor system which extends from one side of housing 12 to the other, having entrance and exit ports 18. The flow-through type of conveyor belt 16 allows machine 10 to be used in line with other processing equipment preceding or following it, to allow a great amount of flexibility in its use. For example, a subsequent step in a food processing operation may include breading, cooking, frying, packaging, or freezing the formed food products immediately after processing in the molding machine 10. Additionally, the flow-through type of conveyor 16 would also allow flexibility in the type of food product formed, with the ability to utilize the molding apparatus to deposit one type of food product onto another type of food product or in another depositing operation. As an alternative to a flow-through conveyor 16, and end feed conveyor may be utilized, wherein the conveyor system 16 simply removes formed products from the machine 10 during processing through a single access port 18.

Above the conveyor system 16, a pressure plate assembly 20 is mounted upon a support structure which will be described in more detail hereinafter. A fill manifold assembly 22 is disposed directly above the pressure plate assembly 20, again mounted on the support structure so as to be aligned with the pressure plate assembly 20. Associated with the pressure plate assembly 20 is a mold plate 24, positioned at the upper portion thereof. The mold plate 24 is formed with at least one mold cavity, and preferably a plurality of mold cavities in one or more sets. In the preferred embodiment, two sets of mold cavities are provided in mold plate 24, with each set successively filled and discharged in opposing fashion in conjunction with two spaced apart fill heads 40 and 42. The mold plate 24 is reciprocally driven by mold plate drive mechanism 28. The drive mechanism 28 may be of any suitable type. In the preferred embodiment, the mold plate drive is hydraulically driven by means of a hydraulic cylinder formed in pressure plate assembly 20 in association with rod 30, which forms part of the hydraulic cylinder. The rod 30 is securely fastened to mold plate 24 by coupling means 32 at an edge thereof. In the preferred embodiment, the mold plate 24 is reciprocally moved at high speed between predetermined positions for performing fill and knock out operations with respect to the mold cavities 26. A mold plate knife assembly 35 or other means may be provided in association with the mold plate 24 to maintain product in the mold cavities formed in the mold plate and also within the fill heads 40 and 42 during reciprocal movement of the mold plate, as will be described in more detail. The mold plate knife assembly 35 may comprise individual knife plate sections corresponding to the set or sets of mold plate cavities, which move reciprocally relative to the mold plate and fill heads 40 and 42. The mold plate knife assembly 35 may also include a mold plate knife drive means 37, which may be of any suitable type, and which can be similar to the mold plate drive 28, using hydraulic cylinders in association with rod 39. Such a mold plate knife may be used to selectively shear the formable material at a position above the mold plate after filling of the mold cavities, as well as functioning to maintain the formable material within the mold cavities as well as in the fill heads 40 and 42.

Preferably associated with the fill manifold assembly 22 are fill heads 40 and 42, which allow the capacity of machine 10 to be doubled. Each of the fill heads 40 and 42 may be constructed similarly, and each comprises a supply manifold 44 for receiving a formable material from an input feed 46. The input feed 46 may supply fill head 40 with formable material from a supply hopper 45 which includes a suitable conveying mechanism (not shown) associated with a drive means 47. For example, material could be conveyed to the fill heads using intermeshing, positive displacement, self-wiping compressor screws such as shown in U.S. Pat. No. 4,043,002, which is hereby incorporated by reference. Thus, formable material from hopper 45 may be positively fed via input feed 46 to a first fill head 40. The formable material from hopper 45 is also positively fed to the second fill head 42 by means of feed tubes 48 communicating between fill head 40 and fill head 42. The formable material from hopper 45 may therefore be applied to the supply manifold 44 of each of the fill heads 40 and 42. Formable material may be supplied to fill heads 40 and 42 under pressure by any other suitable means, such as a different auger feed system or other pumping mechanism such as a piston or vane pump. In the preferred embodiment, the supply hopper 45 may be continuously fed with a formable material from any suitable supply system to allow continuous operation in molding of a formable material using apparatus 10, or the supply hopper 45 may be charged for batch processing. The supply hopper 45 may also be constructed to allow tilting thereof, to facilitate cleaning operations or for other purposes. It should be recognized that formable material could be continuously fed to fill heads 40 or 42 by other suitable means.

Associated with each of the supply manifolds 44 are one or more product plungers 52, providing means for selectively applying pressure on the formable material in each of the supply manifolds 44. In a preferred embodiment, the plungers 52 may be hydraulically actuated cylinders which are selectively moved into the supply manifold 44 to exert pressure on the material therein. It is desired that the plungers 52 exert a substantially uniform force onto the formable material within the manifold 44 at the position of the mold cavities which will be exposed to the formable material during a filling operation. Also in the preferred embodiment, the plurality of plungers 52 used in association with the manifold 44 are each driven separately by suitable drive means, to allow self-adjustment based upon characteristics of the formable material within the supply manifold 44. For example, each of the plungers 52 may be driven by an independent hydraulic cylinder to allow the plungers to adjust for possible variations in the formable materials within manifolds 44, such as cold spots or similar variations in the food products supplied to manifold 44. It should be recognized that the manifolds 44 may be of any desired shape or dimension, and the number of plungers 52 used in association therewith may vary accordingly.

The apparatus 10 also includes a knock out plunger assembly 60 for ejecting the individual portions of the formable material from the mold cavities 26 during operation of the apparatus 10. The knock out plunger assembly 60 may therefore include a plurality of knock out cups (not shown) which may have a shape and dimensions similar to and slightly less than the shape and dimensions of the mold cavities for ejection of the molded material from each of the cavities 26.

In the preferred embodiment both the pressure plate assembly 20 and fill manifold assembly 22 are mounted upon a support structure comprising a plurality of support posts 70, on which each of the assemblies 20 and 22 are aligned. In the preferred embodiment, the assemblies 20 and 22 are individually mounted on the support posts 70, and posts 70 are used to raise each of the assemblies 20 and 22 to a separated and elevated position. A suitable drive mechanism 71 for raising the assemblies 20 and 22 is provided. This positioning of the assemblies facilitates cleaning of all interior surfaces of the apparatus, simplifying use and maintenance.

Although the preferred embodiment of the apparatus 10 as shown in the foregoing figures has a double-head design, to significantly increase capacity over a single-head design, the number of fill heads may be modified for a particular application. Similarly, although a particular number of plungers 52 are shown in use with each of the manifolds 44, a different configuration may be used as desired.

Figure 4:
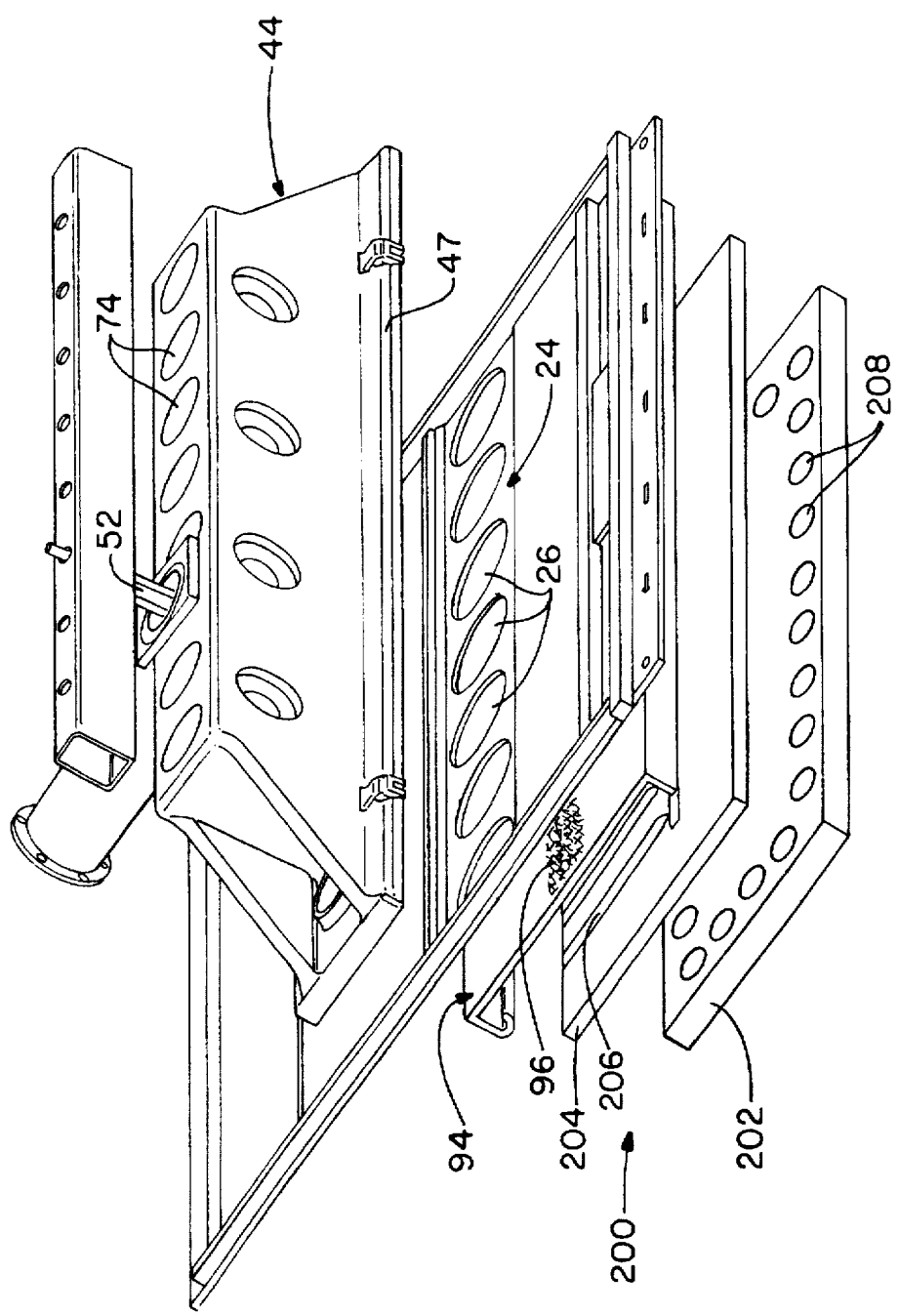
FIG. 4 is a schematic exploded view of a first embodiment of the invention, showing the pressure or reactor plate assembly of the molding apparatus shown in FIG. 1.

Operation of this embodiment of the molding apparatus 10 will be understood with reference to FIG. 4. In FIG. 4, a somewhat schematic representation of one of the fill heads 40 or 42 and associated components is shown in more detail. In FIG. 4, the plungers 52 extend into openings 74 provided in supply manifold 44. The plungers 52 will be reciprocally driven into and out of the supply manifold 44 to selectively apply pressure to a formable material received in the supply manifold 44 from a supply as previously described. In the preferred embodiment, the supply manifold 44 provides a housing having a predetermined volume for receiving an amount of a formable material. The manifold 44 is aligned and fixed in position relative to other components of the machine. Because the supply manifold 44 is at a top portion of the machine, the strength of the member may be increased to minimize deflection without affecting critical spacing between other components of the machine. Further, although the supply manifold 44 can be made to minimize deflection, it is not necessary to absolutely prevent deflection of this member as will become apparent as the description proceeds. On the underside of the supply manifold 44, at least one outlet or discharge opening cooperates with the mold plate 24 and the plurality of mold cavities 26 formed therein. In the preferred embodiment, a knife plate assembly 35, described with respect to FIGS. 1–3, is disposed between supply manifold 44 and mold plate 24. The operation of mold plate knife assembly will be described in more detail hereinafter. The mold plate 24 in the preferred embodiment, is a relatively thin section plate, which is not designed to withstand the pressures which will be applied thereto during the filling operation. In operation, the mold plate 24 is cyclically and reciprocally moved between fill and discharge or knock out positions. The mold plate 24 is reciprocally driven by a mold plate drive mechanism, such as that described with reference to FIGS. 1–3.

Disposed below mold plate 24 may be provided a vent plate 94 having a plurality of vent openings 96 formed over at least a portion thereof. The vent openings 96 are preferably positioned to correspond to the position of the plurality of mold cavities 26 of the mold plate 24 during a fill operation. The vent holes 96 may therefore be formed in any configuration, such as clustered in the region of the mold cavities 26, formed in a pattern corresponding to the perimeter each mold cavity 26 or in another configuration as desired. The vent plate 94 provides a flush bottom surface against the mold cavities 26, and also separates the mold cavities 26 from other machine components. The vent plate 94 may also include grooves or channels on its bottom surface for venting from the mold cavities in conjunction with other machine components. The vent plate 94, although perhaps desirable for a variety of formable materials, is not a critical component of the forming machine, and suitable venting from the mold cavities may be provided in other manners, such as providing vent channels or the like within the mold plate 24 itself.

The supply manifold 44, mold plate knife assembly 35, mold plate 24 and the vent plate 94 if used, are each aligned with a pressure plate assembly 200. The pressure plate assembly 200 comprises in the preferred embodiment a first pressure plate member 202 which carries therewith a floating clamp or reactor plate 204.

Operation of the components as shown in FIG. 4 to mold a formable material within mold cavities 26 will be understood more clearly with reference to FIGS. 5–7. The method or process to mold formable materials will also become apparent in association with operation of the machine. In general, it is first mentioned that the construction of the molding machine 10 as well as its operation departs significantly from conventional techniques used in such molding machines. Under conventional thinking, the operation of a molding machine includes applying significant pressures on the food product to urge it into mold cavities of a mold plate. The construction of the machine was intended to prevent deflection of the various members supporting the mold plate in order to rigidly contain the volume of the food product that was to be molded, and thereby control the weight and dimension of the resulting product. In high-speed, large scale food processing systems, preventing deflection of the structural members of the machine requires that the width or thickness of various components be designed to withstand the pressures applied. The limitations on width or thickness of the structural members, particularly applied to the mold plate and supporting structures, in turn create a limitation in terms of width of machine and overall capacity of the machine.

In the present invention, departing from the concept of zero deflection, deflection which will occur upon the application of these significant pressures in a filling operation is compensated for by the pressure plate assembly 200 and floating clamp plate 204. To maintain proper spacing from the mold plate 24 to the conveyor system of the machine 10, the thickness of the pressure plate 200 and corresponding structure is desirably minimized. The pressure plate assembly 200, including the plate member 202 and clamp plate 204 are therefore relatively thin section structural members. The clamp plate 204 preferably includes a plurality of vent channels 206 to allow the escape of air from the mold plate cavities 26 during a filling operation or for removal of flushing or cleaning fluids during a cleaning cycle. At positions around the periphery of clamp plate 204 are provided a plurality of pistons 208, which are utilized to force the reactor plate 204 against the bottom surface of the supply manifold 44 to thereby clamp the mold plate 24 against supply manifold 44. The force applying mechanism to apply pressure on the clamp plate 204, which in the preferred embodiment comprise pistons 208, are preferably positioned to correspond to the exterior frame or base of the supply manifold 44, so as to sandwich the mold plate firmly against the manifold 44. As both the pressure plate 202 and clamp plate 204 would not in general have the structural integrity to withstand the pressures applied via supply manifold 44 during a filling operation in the machine, deflection of these members is compensated for by the means to apply pressure to the clamp plate 204, thereby eliminating the need for structural members having the required strength to prevent deflection thereof. The pressure plate assembly 200 may therefore deflect significantly under load, but any deflection will be compensated for by the means to apply pressure to the clamp plate 204. The floating nature of clamp plate 204 allows it to be positively clamped to the underside of the mold plate 24, along with the vent plate 94 if used. Positively clamping the clamp plate 204 against the underside of the mold plate 24 results in retaining the thickness of the mold cavities 26 relative to the discharge opening of the supply manifold 44, to precisely produce products having a uniform weight and dimension regardless of any deflection. The arrangement of the floating clamp plate 204 in association with pressure plate assembly 200 therefore allows the width of the clamp plate to be increased without a corresponding increase in its structural integrity, as deflection of the thin-section members is compensated for by the pressure applying system associated with the pressure plate assembly 200. This in turn enables the width of the mold plate 24 to be significantly increased, allowing much wider forming machines to be produced, which can dramatically increase capacity of such machines. As the molding machine also accommodates a double manifold arrangement such as shown in the embodiment of FIGS. 1–3, the overall increase in capacity of the machine is particularly significant.

The pressure plate assembly 200 is shown in more detail with respect to FIGS. 5–8. In this embodiment, the plurality of pistons 208 are provided in the reactor block or pressure plate 202 to apply force against and move clamp plate 204 upwardly against the underside of vent plate 94 and correspondingly mold plate 24. In the preferred embodiment, the pistons 208 are limited travel, hydraulically actuated pistons which may be driven from the main hydraulic system used in conjunction with driving the mold plate 24 and mold plate knife assembly 35 as well as other components of the machine. Upon actuation of pistons 208, the clamp plate 204 is firmly pressed against the mold plate 24 to clamp mold plate 24 against supply manifold 44. As the pistons 208 are situated to clamp reactor plate 204 in alignment with lower flange 47 of supply manifold 44, the reactor plate 204 is bridged across the access opening of supply manifold 44. This allows the floating reactor plate 204 some amount of deflection, which will in turn translate to the pressure plate 202. The compensating deflection in the pressure plate 202 in conjunction with the firm clamping relationship of these components to the supply manifold 44 serves to maintain the thickness of the mold cavities 26 relative to the supply manifold 44 to allow precise filling and molding of the formable material within the cavities 26. This precise filling operation is obtained while allowing deflection of the components, reducing the requirement for structural integrity within these machine components. In turn, this allows the width of the machine to be significantly increased without a corresponding increase in the structural integrity which would be required to avoid deflection.

In operation of machine 10, filling and knockout cycles are repeatedly performed in conjunction with each of the supply manifolds 44 and a set of mold cavities 26 formed in mold plate 24. After charging of the supply manifold 44 with a formable material, the formable material is preferably isolated within manifold 44 as will be hereinafter described in more detail. Isolating manifold 44 from product infeed pressure during a fill cycle is desirable to prevent the flowing back of formable material against the product infeed during the filling operation, resulting in more gentle handling of the material. Further, for many applications and materials, it is possible to perform multiple fill cycles without requiring the manifold 44 to be recharged, further increasing capacity of the machine. With manifold 44 filled with a formable material, the pressure plate assembly 200 is actuated to pressurize clamp plate 204 against the mold plate 24 and supply manifold 44. The product plungers 52 are actuated to pressurize formable material within manifold 44 so as to force it into the mold cavities 26. In this process, the formable material within manifold 44 is urged full-face into each of the mold cavities 26. There is thus no need to force the formable material from supply manifold 44 through a filling slot or the like, which for certain materials will provide gentler handling thereof. Alternatively, for certain applications, the formable material may be directed through a feed slot(s) or opening(s) to achieve certain characteristics in the molded material, such as fiber orientation or dispersion as examples.

In the filling operation, it should be recognized that as clamp plate 204 is pressurized against mold plate 24, the mold plate 24 is fixed in the clamped position relative to manifold 44 and the mold plate 24 does not move during the filling operation. This also results in less damage to the formable material which may be caused by movement of the mold plate 24 during the filling operation. Additionally, as the material within manifold 44 can be isolated from the infeed, actuation of the product plungers 52 can impose very high pressures on the material within manifold 44, while not requiring high product infeed pressures. Thus, the pressure applied to feed the material from the supply hopper 45 shown in the embodiment of FIG. 1, may be a low pressure, also providing gentler handling of the formable material using apparatus 10. The low pressure feed achievable in the apparatus also allows for a variety of systems for feeding product to the supply manifolds 44, such as a screw auger system or other low pressure pumping mechanism.

After filling of the mold cavities 26 as previously described, pressure on the clamp plate 204 via pistons 208 is relieved, while simultaneously relieving pressure applied by the product plungers 52 within supply manifold 44. This in turn will result in declamping of clamp plate 110 relative to mold plate 24 to release the mold plate 24 from its locked position relative to the supply manifold 44. At this time, the mold plate 24 is moved from the fill position, to a knock out or discharge position, wherein cavities 26 are moved to be aligned with knock out plunger assembly 60 as shown in FIGS. 1–3. Along with depressurization of the clamp plate 204 and of the product plungers 52, the manifold 44 can be recharged with additional formable material if required to replace that just removed in the mold cavities. As will be described in more detail, the mold plate knife assembly will also seal off the manifold 44 during movement of the mold plate 24 between fill and knockout positions.

In the preferred embodiment, the supply of formable material to manifold 44 may be controlled in conjunction with movement of the mold plate 24, such that movement of mold plate 24 to the fill position will cause corresponding isolation of manifold 44 for filling, and movement of the mold plate 24 to a knock out position will cause corresponding feed of material to manifold 44. The molding machine of the present invention provides high-speed movement of the mold plate from the fill and knock out positions, and thus a complete fill and knock out cycle can be performed extremely quickly.

During the fill operation, wherein clamp plate 204 is pressurized against the bottom of the mold plate 24 and against the manifold 44, air trapped in the mold cavities 26 must be vented as the formable material is urged into the mold cavities upon actuation of the product plungers 52. A venting mechanism is therefore provided to allow the escape of trapped air from the mold cavities 26. The venting mechanism may be of any suitable type, and may comprise a plurality of channels 206 formed in the clamp plate 204 as shown in FIG. 7. The vent channels 206 work in conjunction with vent plate 94 (if used), and are in communication with mold cavities 26. In the preferred embodiment, the vent channels 206 include a set of grooves 207 running across plate 204, each of which communicates through a shallow groove 207a with a lengthwise groove 207b. Each of the grooves 207 communicate with the edge of the plate 204 to allow the escape of fluids therefrom. In the preferred embodiment, the vent plate 94 is formed to fit directly over and snap into position with respect to clamp plate 204. As seen in FIGS. 8a and 8b, the vent plate 94 includes a downwardly extending edge wall 95 adapted to be positioned adjacent one edge of clamp plate 204. The opposing edge of vent plate 94 is provided with a J-shaped channel 97 which extends around and snaps the vent plate 94 into position with the clamp plate 204. The J-shaped channel 97 also communicates with the plurality of grooves 207, to urge fluids out of machine 10. It is also desirable in operation of the machine to enable cleaning of scraps of food or other formable material which may be produced during operation of the machine. As formable material is forced from the supply manifold 44 into mold cavities 26 against the clamp plate 204 and vent plate 94 if used, scraps of food may be pushed through the openings within the vent plate 94 or into the grooves 207. In the preferred embodiment, a supply pipe 212 may be provided in conjunction with pressure plate assembly 200 to supply water or other cleaning fluid to this area for flushing and thereby increase cleanliness in operation. Such considerations are desirable for applications in food processing as an example. The supply pipe 212 may communicate with groove 207b formed in clamp plate 204 to supply cleaning fluid under pressure to each of the grooves 207 through shallow grooves 207a to flush any debris therefrom. The vent plate 94 may therefore also be provided with corresponding channels if desired, to allow venting or flushing of this area.

Also in this embodiment of the invention, the machine 10 may include an adjustable knock out assembly 220 shown in FIGS. 9 and 10. The knock out assembly 220 is mounted via mounting blocks 222 to a knock out drive mechanism which will cause reciprocal movement of the assembly to selectively knock out materials formed into mold cavities 26. The assembly 220 further includes a plurality of knock out plungers 226 corresponding to the size and shape of the mold plate cavities 26 mounted on bar 224. As seen in FIG. 9, the plungers 226 may be round for burgers or the like, or for chicken nuggets as seen in FIGS. 10a and 10b. Other forms of mold plate cavities 26 and knock out plungers 226 are contemplated, such as for chicken strips as seen in FIG. 10c. Each of the different types of plungers 226 may be mounted on the bar 224, and if desired, a plurality of sets of plungers 226 may be mounted on the bar 224. Using a number of smaller sets of plungers 226 with more intricately shaped or smaller cavities 26, and providing adjustment of the positioning of individual sets will also provide easier adjustment of the knock outs relative to the mold plate cavities 26. The mounting blocks 222 further allow the bar 224 to be adjusted in three dimensions so as to properly position the knock out plungers 226 with respect to the mold plate cavities 26 when in their knock out positions. In the preferred embodiment, the bar 224 includes slots 225 in each end which cooperates with an upwardly extending mounting pin 223. The slots 225 allow the position of the bar 224 to be adjusted lengthwise relative to the pins 223. Further, the mounting blocks 222 are adjustable from side to side to facilitate alignment adjustment. A lock down device 227 may then be used to lock the position of the bar 224 and the blocks 222 when in the desired position.

Figure 11:
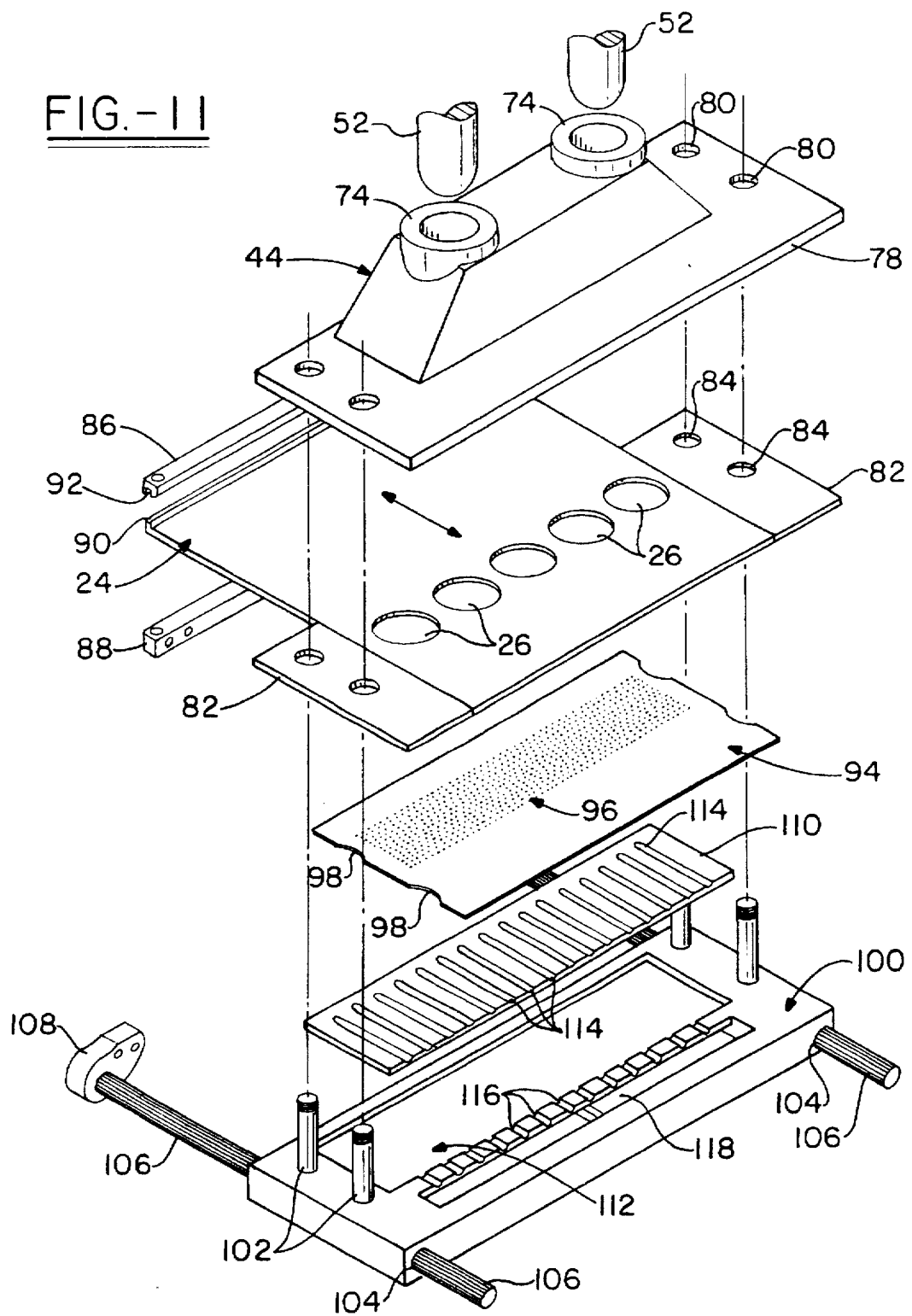
FIG. 11 is a schematic exploded view of another embodiment of the invention, showing the pressure or reactor plate assembly of the molding apparatus shown in FIG. 1.
Figure 12:
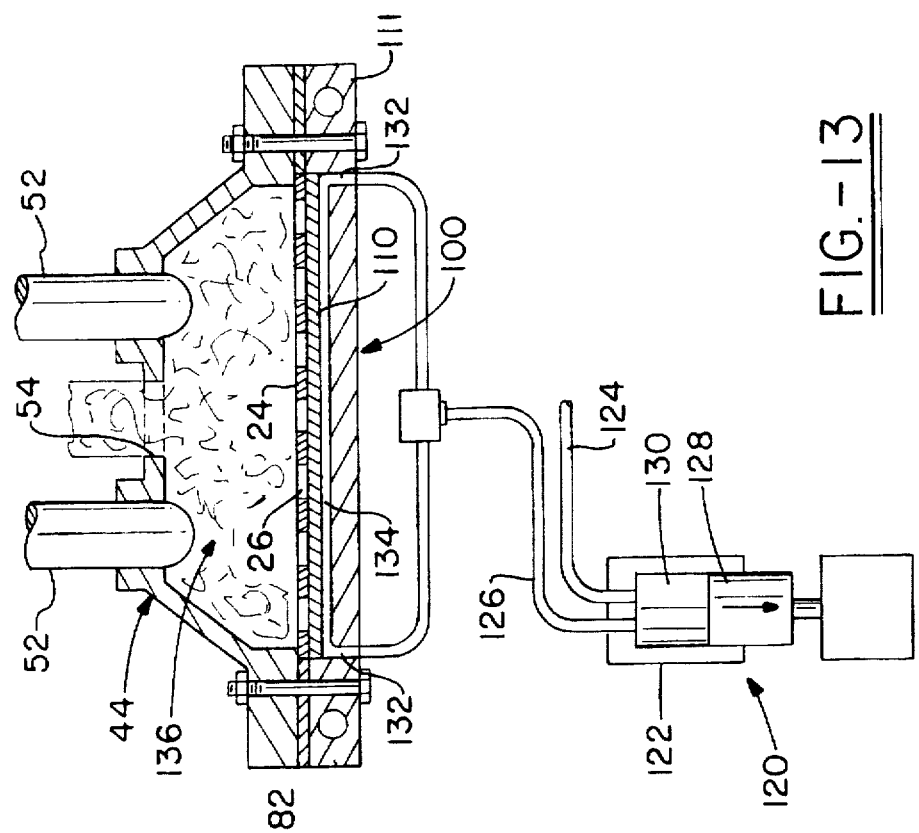
FIGS. 12 and 13 show schematic cross sections of a supply manifold in the embodiment of FIG. 11 during product fill and knock out cycles in operation of the apparatus.
Figure 13:
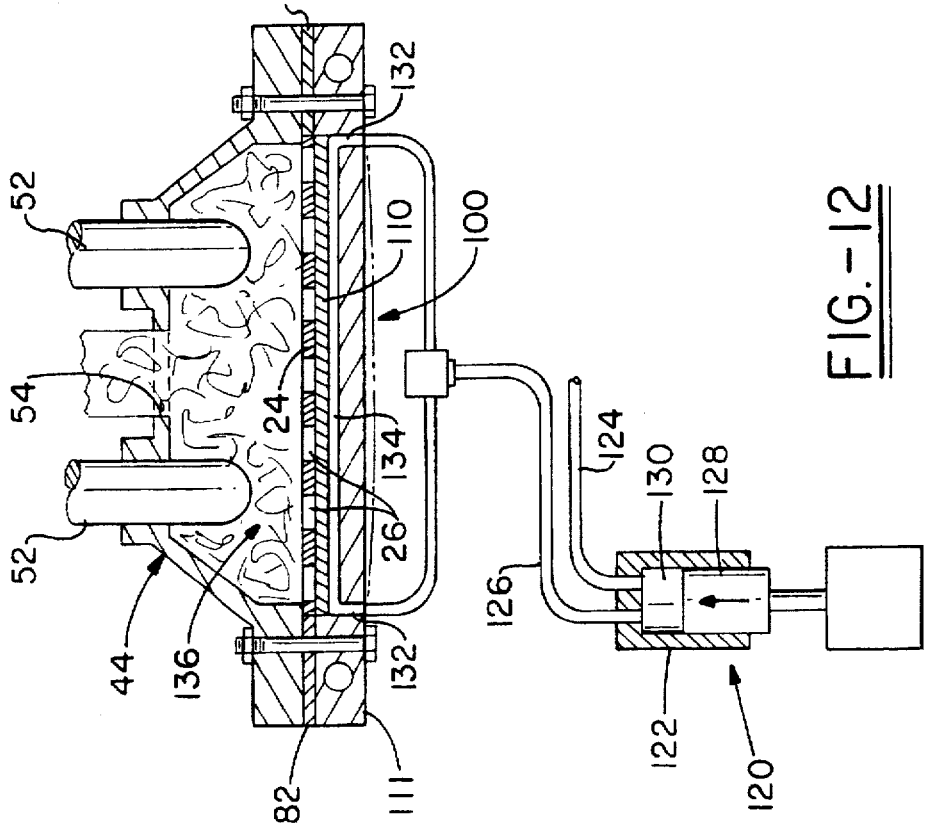

Another embodiment of the pressure plate assembly is shown at 100 in FIGS. 11–14, with FIG. 11 showing an exploded view of the pressure plate assembly 100 in conjunction with other machine components. The pressure plate assembly 100 includes a pressure plate 111 and a clamp plate 110 mounted in cavity 112. FIG. 12 shows the machine in a clamp mode for performing a mold cavity filling operation. In this embodiment, the arrangement of the supply manifold 44, the mold plate 24, and the vent plate 94 may be generally similar to that described in FIG. 4. The mold plate 24 may be driven by a suitable drive mechanism. As an example seen in FIG. 11, the drive mechanism may be a push bar mechanism comprising a clamp bar 86 and a push bar 88 which couple the mold plate 24 to the drive mechanism. In a preferred example, the mold plate 24 includes a keyed edge that is designed to fit within a corresponding slot 92 formed in the clamp bar 86. The push bar 88 may then be secured to the clamp bar 86 to clamp the entire edge of the mold plate 24 therebetween, so as to distribute the load over the extent of the push bar while moving the mold plate 24 via the drive mechanism. Other suitable means of coupling the mold plate 24 to the drive mechanism are contemplated herein.

The supply manifold 44, mold plate knife assembly 35, mold plate 24 and the vent plate 94 if used, are each aligned with a pressure plate assembly 100. In the stacked configuration, the mold plate 24 moves reciprocally between fill and discharge positions relative to the other components. The pressure plate 100 may further include holes 104, which together with push rods 106 form the mold plate drive mechanism in the preferred embodiment. Each push rod 106 forms part of a hydraulic actuator to move rod 106 reciprocally relative to the pressure plate 100. A mounting head 108 is secured to the push bar 88 mounted with the mold plate 24 for driving thereof. A floating clamp plate 110 is disposed within a cavity 112. A seal is formed about the periphery of clamp plate 110 within cavity 112, by suitable means such as an O-ring seal. The clamp plate 110 therefore seals the cavity 112 but can float within cavity 112 while maintaining the sealing relationship within cavity 112. The clamp plate 110 preferably includes a plurality of vent channels 114 formed on its upper side adjacent vent plate 94, to allow the escape of air during a filling operation. The pressure plate 100 can also include a plurality of corresponding vent channels 116, which cooperate with vent channels 114 formed in the clamp plate 110 to facilitate removal of air or moisture to a vent passage 118 which communicates with vent channels 116. In FIG. 12, the force or pressure applying means generally designated 120 is preferably a fluid pressure regulator 122 having a fluid supply line 124 and a fluid output line 126. A piston 128 or other suitable mechanism applies pressure to the fluid introduced by the supply line 124 to an internal cavity 130 so as to be forced under pressure out line 126. The piston 128 may be hydraulically driven in the preferred embodiment, but any suitable arrangement to force fluid at a desired pressure through the output line 126 is contemplated. Fluid in line 126 may then be diverted to opposed sides of the pressure plate 100, and introduced through access ports 132 to be injected into the cavity 112 and against the underside of the clamp plate 110. As pressurized fluid is introduced into the cavity 112 which is sealed by means of the clamp plate 110, the clamp plate 110 floats upwardly within cavity 112 until it is forced against the mold plate 24, or against a vent plate 94 and mold plate 24 if a vent plate 94 is utilized. In FIG. 12, no vent plate 94 is shown, although it is recognized that for a variety of different formable materials, the vent plate may be used to achieve the advantages described previously. The preferred mold plate knife assembly 35 has also been removed for clarity. Pressurizing of the space beneath clamp plate 110 firmly seals the clamp plate 110 against the bottom of the mold plate 24, and therefore against the bottom of the supply manifold 44. Thus, in the clamp mode shown in FIG. 12, the clamp plate 110, mold plate 24, and manifold 44 are firmly clamped to one another for filling of the mold cavities in the mold plate 24.

As seen in FIG. 12, fluid pressure applied by the pressure applying means 120 onto the bottom of the clamp plate 110 will cause compensating deflection in the pressure plate 111, which maintains clamp plate 110 in firm clamping relation relative to the manifold 44 to maintain the position of the mold plate and therefore of the mold cavities relative to the manifold 44. Thus, even if the manifold 44 were to deflect, the mold plate 24 will conform to it to precisely fill and mold the formable material in the cavities 26. In this arrangement, the clamp plate 110 does not operate in flexure, as a beam would have to, and thereby eliminates the need to provide the clamp plate with a very thick cross-section or mass which would accommodate the forces encountered during a filling operation. The amount of deflection in the pressure plate 111 will depend upon the forces applied during a filling operation, but such deflection is not of significant concern, as the clamp plate 110 at all times firmly clamps the mold plate 24 to manifold 44 to work in the desired manner in conjunction therewith.

Filling of the mold cavities 26 is performed when the clamp plate 110 is pressurized in the manner as shown in FIG. 12. Further aspects of a filling cycle will be described with reference to FIG. 12, wherein it is noted that the supply manifold 44 has been charged with a formable material as shown at 136. After charging of the supply manifold 44 with the formable material, the formable material 136 may be isolated in manifold 44. Isolating the manifold 44 from the product infeed pressure during a fill cycle may be performed so as to not allow any material within the manifold 44 to flow back against the product infeed, thereby handling the formable material more gently to avoid damaging it. Once the manifold 44 is filled, the pressure plate 111 is activated to pressurize clamp plate 110, the product plungers 52 are actuated to pressurize the formable material 136 within manifold 44 so as to force it into the mold cavities 26. Again, the formable material is simply pushed from a position directly above the mold cavities 26 into the cavities for filling or may be directed through a feed slot or opening to achieve certain characteristics in the molded material.

Immediately after filling of the mold cavities as described with reference to FIG. 12, pressure on the clamp plate 110 is relieved, such as by withdrawing piston 128 from cavity 130. In this embodiment, depressurization of pressure applying mechanism 120 will create a slight negative pressure on the clamp plate 110 to pull it slightly away from the mold plate 24, allowing relatively free movement of the mold plate to the discharge or knock out position and allowing low pressure feeding of product to fill the manifold 44 without degradation of the material. At the same time, enough pressure remains on the clamp plate 110 to prevent leakage of material from the manifold due to feed pressure. Residual pressure on the clamp plate is therefore equal to or slightly greater than feed pressures exerted upon recharging of the manifold 44 so as to retain the formable materials within the manifold above the mold plate knife structure. A slight negative pressure on the clamp plate itself applied through the mechanism 120 allows movement of the mold plate 24 immediately after a fill cycle is complete to minimize cycle times. In the preferred operation, the pressure applying mechanism 120 may be tied into the actuation of the product plungers 52, so that each will be actuated or deactuated simultaneously with one another.

Figure 14:
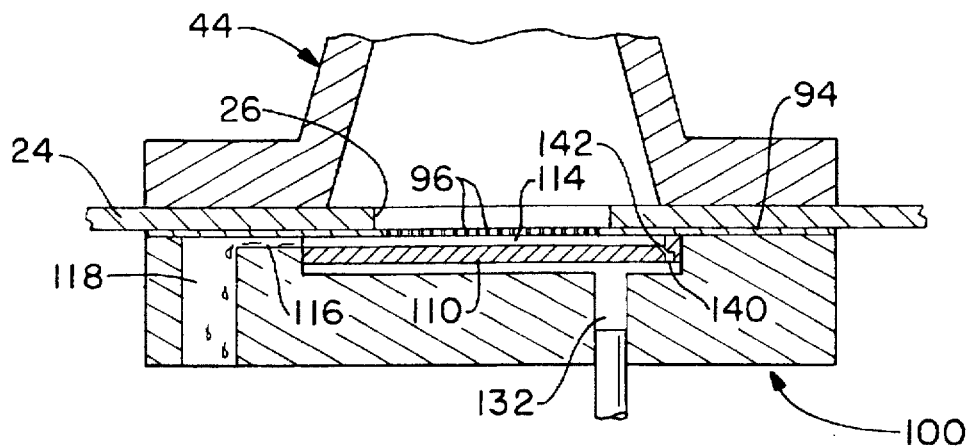
FIG. 14 shows a schematic cross section of the supply manifold shown in FIG. 11 during a filling cycle of the molding apparatus.
Figure 15:
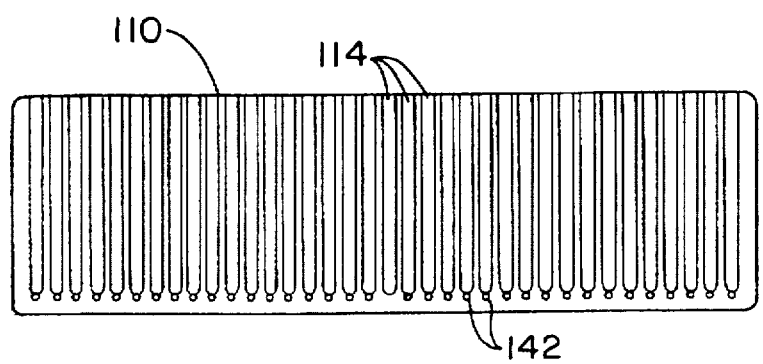
FIG. 15 shows a top view of the clamp plate in the embodiment of FIG. 11.

Also in this embodiment, the venting mechanism is provided in association with the clamp plate 110. The clamp plate 110, being disposed either directly adjacent to the mold plate 24 or having a vent plate 94 with vent holes 96 disposed therebetween, will expose the top surface of the clamp plate 110 to air escaping from the mold cavities 26 during filling. As shown more distinctly in FIG. 15, the clamp plate 110 may include a plurality of vent channels 114, positioned to receive vented air from the mold cavities to allow its escape. As seen in FIG. 11, the vent channels 114 of the clamp plate 110 communicate with corresponding vent channels 116 formed in pressure plate 100 to allow escape of air to a vent passage 118 which communicates with the external atmosphere. In FIG. 14, the evacuation of air or gasses is shown. As previously indicated, during a filling operation, the clamp plate 110 is pressurized to be clamped against mold plate 24, and any air trapped in the mold cavities 26 will be vented through the vent openings 96 in a vent plate 94 if used, and into a vent channel 114. Gasses received in the vent channel 114 are then urged into a vent channel 116 associated with the pressure plate 100, and to the vent passage 118. The vent passage 118 may be coupled to a suitable catch tank or exhaust as desired. The venting of trapped air from the mold cavities 26 allows pressurization of the clamp plate 110 against the mold plate 124 to be maintained during filling of the cavities as desired. The venting means are therefor very important to properly performing a filling cycle when machine 10 is in the clamp mode.

Figure 16:
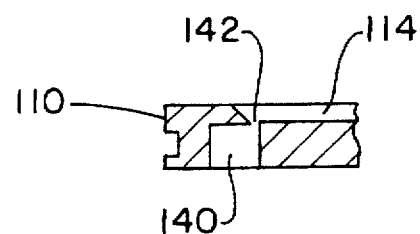
FIG. 16 is a partial cross-sectional view of the clamp plate shown in FIG. 15, showing a vent passage associated therewith.

In the preferred form of this embodiment, there may also be provided a cleaning system for cleaning the vent channels 114, 116, and the vent passage 118. It has been found that with various types of food products, during filling of the mold cavities, air forced out of the cavities through the vent plate 94 and/or vent channels 114 of the clamp plate 110, may contain protein molecules, meat fat molecules or other materials. The protein and meat fat molecules may tend to coat the vent channels 114, for example, and it would be desirable to prevent this coating action. As shown in FIG. 14, and in more detail in FIG. 16, the clamp plate 110 may also be provided with a series of openings 140 formed in the underside of the clamp plate 110, which in a clamp mode will be exposed to the pressurized fluid supplied by the pressure applying means or intensifier 120 in the preferred embodiment. The openings 140 do not extend through the clamp plate 110, but are provided with a very small orifice 142 which communicates with an associated vent channel 114. In the clamp mode, the preferred embodiment uses pressurized water which is injected into pressure plate 100 to pressurize the clamp plate 110 as previously described. The pressurized water is forced into the openings 140 and a small amount is injected through the orifice 142 associated with each of the vent channels 114. In this manner, a small amount of water is injected into each of the vent channels 114 during evacuation of any air trapped in the mold cavities during filling. The injection of water into the vent channels 114 and correspondingly vent channels 116 formed in pressure plate 100 keeps the vent channels and orifices 142 clean by keeping the surfaces thereof wet to prevent coating or clogging by any protein, meat fat, or other entrained molecules in the evacuated air. In the preferred embodiment, the orifices 142 are positioned at an angle to connect with the vent channel 114, such as a 45° angle relative to the vent channel 114, to inject fluid down the channel for wetting of the surfaces. As the orifices 142 are of very small size, only a small amount of water is injected therethrough and no water will contact the formable material during a fill cycle in any way. The provision of jet spray cleaning in this fashion has been found to be particularly important when molding and forming poultry products for example. Although the jet spray cleaning system may be useful for a variety of formable materials, the jet spray cleaning arrangement is optional, and may not be necessary. In addition, as shown in FIG. 11, a number of further jet spray cleaning orifices may be provided in a central divider 144 provided in the vent passage 118, to also maintain the surfaces of passage 118 wet for a similar purpose. Although only a small amount of water would be used in such a system, any excess water would also be vented to an external catch tank or the like as shown in the stream of vented fluids in FIG. 14.

Figure 17:
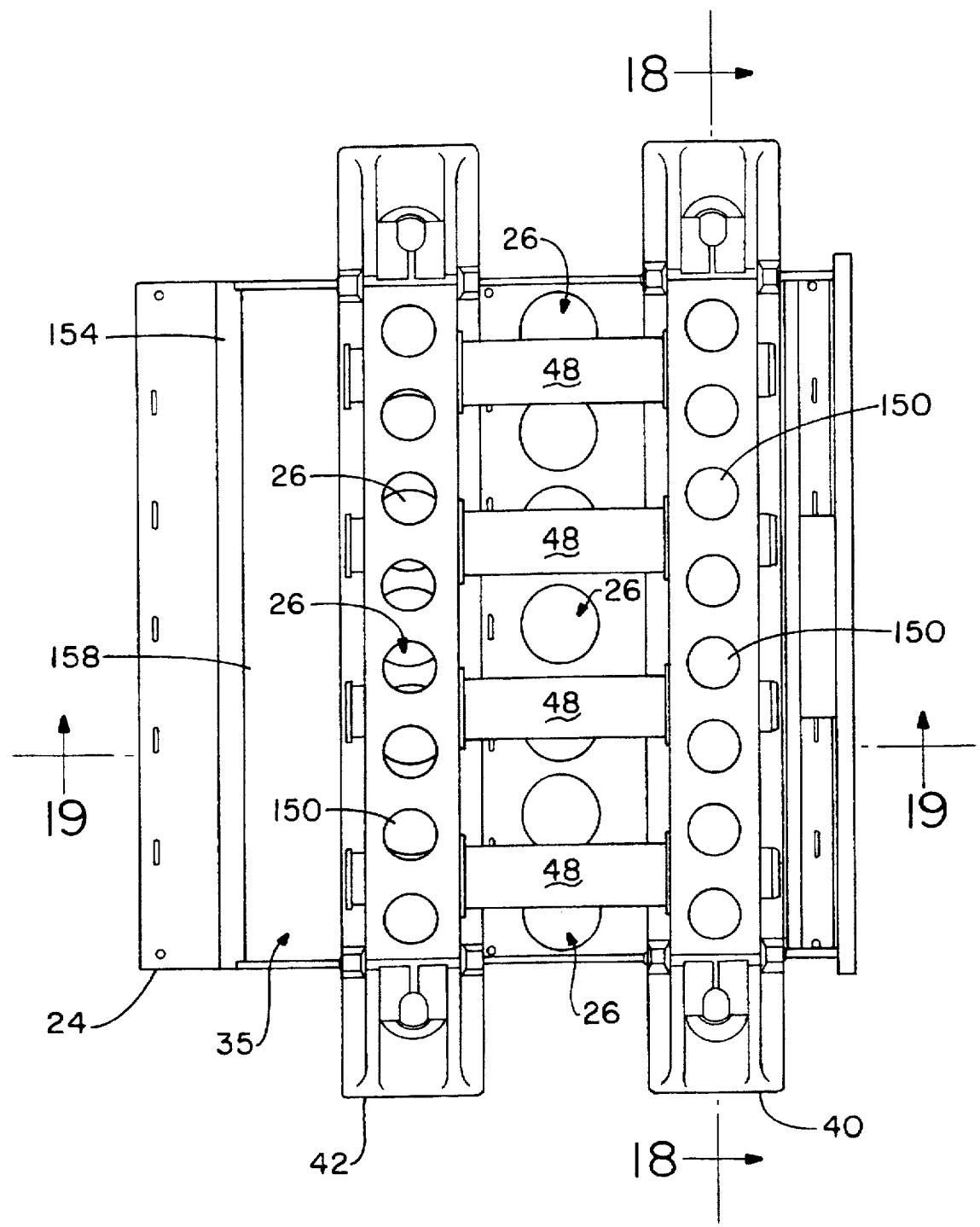
FIG. 17 is a top view of the supply manifolds, mold plate knife assembly and mold plate according to the preferred embodiment of the invention as shown in FIG. 1.

Turning now to FIGS. 17–19, the fill heads 40 and 42 of the preferred embodiment as shown in FIGS. 1–3 along with associated structures are shown more distinctly. In FIGS. 17 and 18, each of the heads 40 and 42 are shown to include a plurality of chambers 150 into which the product plungers 52 extend as referred to in FIGS. 1–3. In these figures, the plungers 52 have been removed for clarity. In the preferred embodiment, supply of a formable material from the supply hopper 45 described in FIGS. 1–3, will introduce the formable material into head 40 by means of input means 46. In the preferred embodiment, formable material is supplied to each of the fill heads 40 and 42 by means of supply tubes 48, which communicate with the supply hopper 45 and extend through head 40 and are in communication head 40 by means of openings 164 which communicate with the internal volume of the supply manifolds 44. The supply tubes 48 also extend to and are in communication with fill head 42 via similar openings 146. Formable material is thus directly supplied to both fill heads 40 and 42 via the feed tubes 48, which as shown in FIG. 18, each communicate with several of the chambers 150 provided in the manifold. Communication of the tubes 48 with several of the chambers 150 ensures proper supply of the formable material to manifold 42 in a uniform manner. Below each of the chambers 150 is a volume or space 152 which communicates with each of the chambers 150. As previously described, formable material introduced into the fill heads 40 and 42 is thus distributed by means of the product plungers 52 into space 152 and thereafter into the mold cavities 56 formed in mold plate 24. In the preferred embodiment, mold plate 24 includes two series of mold cavities 26, having a predefined shape and volume for producing a molded product of a desired configuration. In the embodiment shown in the figures, the mold cavities 26 are circular, and would produce patties for example, although other configurations are contemplated herein. In the preferred embodiment, the supply manifolds 40 and 42 extend across the width of apparatus 10, and mold cavities 26 are formed as a series of cavities which correspond to the space 152 formed at the lower region of the fill heads 40 and 42. When one series of cavities 26 is exposed to one of the supply manifolds, which in FIG. 17 is indicated as fill head 42, the other series of mold cavities 26 are positioned between the fill heads 40 and 42 in a knockout position. In this way, it should be understood that as one series of cavities is being filled with a formable material the other set of cavities 26 is positioned in a knockout position after being filled via the other of the fill heads. Subsequently, the mold plate 24 is moved to expose the other set of cavities 26 to the other of the fill heads for filling, while the just filled set of cavities 26 is moved to the knockout position. In this way, extremely high capacities can be achieved in the dual fill head arrangement of the preferred embodiment.

Also shown in FIGS. 17 and 19 is the mold plate knife assembly 35 which works in conjunction with the fill heads 40 and 42 and the mold plate 24 to facilitate formation of molded food products having precise weight and shape as well as to promote gentle handling of the formable materials to maintain their integrity. The mold plate knife assembly 35 as previously mentioned includes a drive mechanism 37 as described with respect to FIG. 1, which causes reciprocal movement of a support frame 154 relative to the fill heads 40 and 42. Coupled to the frame 154 are first and second mold plate knives 156, each of which cooperates with one of the fill heads 40 or 42 respectively. As shown in FIG. 19, the mold plate knife assembly 35 may also include backup knife members 160, each of which cooperates with one of the mold plate knives 156 respectively. The mold plate knives 156 also work in conjunction with mold plate 24 during fill and knockout procedures to provide significant advantages as will be hereinafter described with respect to the preferred operation of the apparatus.

Figure 20:
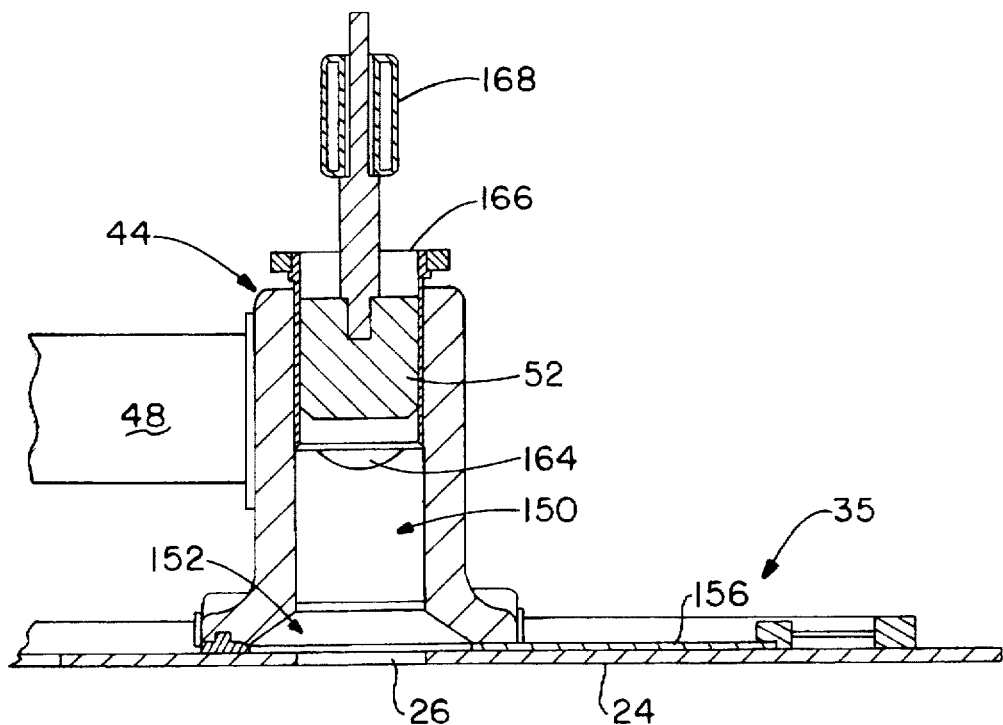
FIG. 20 shows a partial cross-sectional view of the supply manifold including a product plunger, sleeve piston, mold plate knife assembly and mold plate showing a filling cycle of the molding apparatus in a first stage according to the preferred embodiment.
Figure 21:
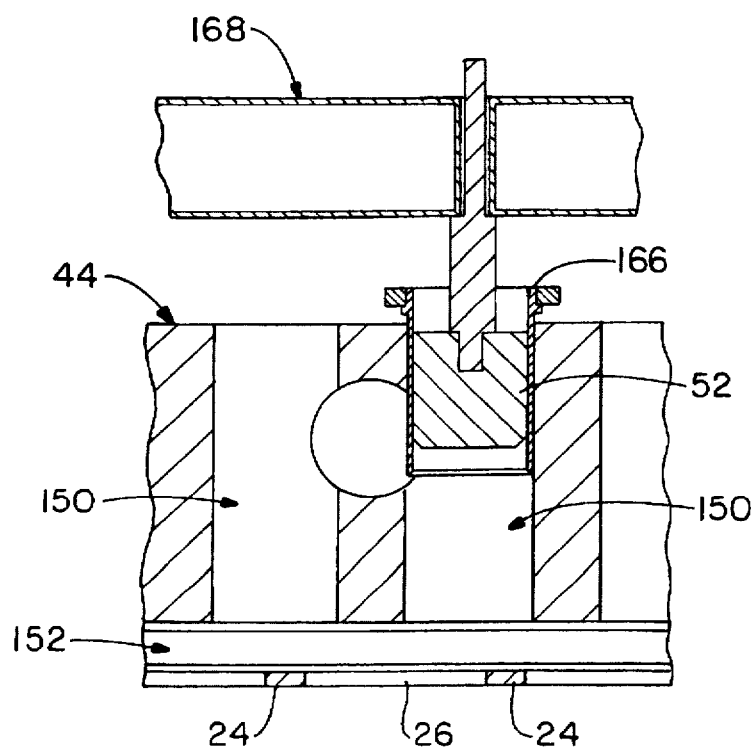
FIG. 21 is a partial cross-sectional view of the supply manifold showing the sleeve valve in a shut off position.

Turning to FIGS. 20–28, a preferred mode of operation of the mold plate 24 and mold plate knife assembly 35 will be described in more detail. In these figures, a single one of the fill heads 40 or 42 is shown with respect to the mold plate 24 and mold plate knife assembly 35, and reference is simply made to the supply manifold 44. The operation of the mold plate 24 and mold plate knife assembly 35 should also be understood to be in conjunction with the operation of the pressure plate assembly 100 and associated structures as described with respect to the pressure plate embodiments for performing fill and knockout procedures. In FIGS. 20 and 21, a first stage of operation will be described with reference to one of the fill heads 40 or 42 with it being understood that each of the fill heads 40 and 42 are successively used in fill operations with respect to each of the sets of mold cavities 26 as described in FIGS. 17 and 19. The supply manifold 44 is shown with a product plunger 52 disposed in operative relationship relative to chamber 150. Also associated with each of the chambers 150 in supply manifold 144 is a sleeve valve 166, which is also made to move reciprocally within chamber 150. The sleeve valve 166 operates to successively close off supply of a formable material from the supply hopper via feed tubes 48 as previously mentioned. In FIGS. 20 and 21, a filling operation for the supply manifold 44 in a first stage is shown, with it being assumed that the supply manifold 44 is filled with a formable material. With the sleeve valve 166 positioned as shown in these Figs., the valve effectively shuts off supply of the formable material by moving down and closing opening 164 communicating with chamber 150. When supply of the formable material is shut off, the product plunger 52 is moved downwardly to apply pressure to the formable material within the volume of space 150 and 152 to force the formable material into the mold cavity 26 exposed thereto in a fill operation. During the fill cycle, the mold plate knife 156 associated with the particular fill head is positioned in an open position to allow communication between the space 152 and the mold cavities 26. The mold cavities 26 are thereby filled as the product plunger 52 is moved downwardly into region 150 by means of a suitable product plunger drive means generally indicated at 168. The action of the product plunger 52 will gently urge formable material within the supply manifold 44 into the mold cavities 26 to also facilitate maintaining the integrity of the formable material. The sleeve valve 166 prevents back flow of formable material against the product input supplied through feed tube 48 and opening 164.

Figure 22:
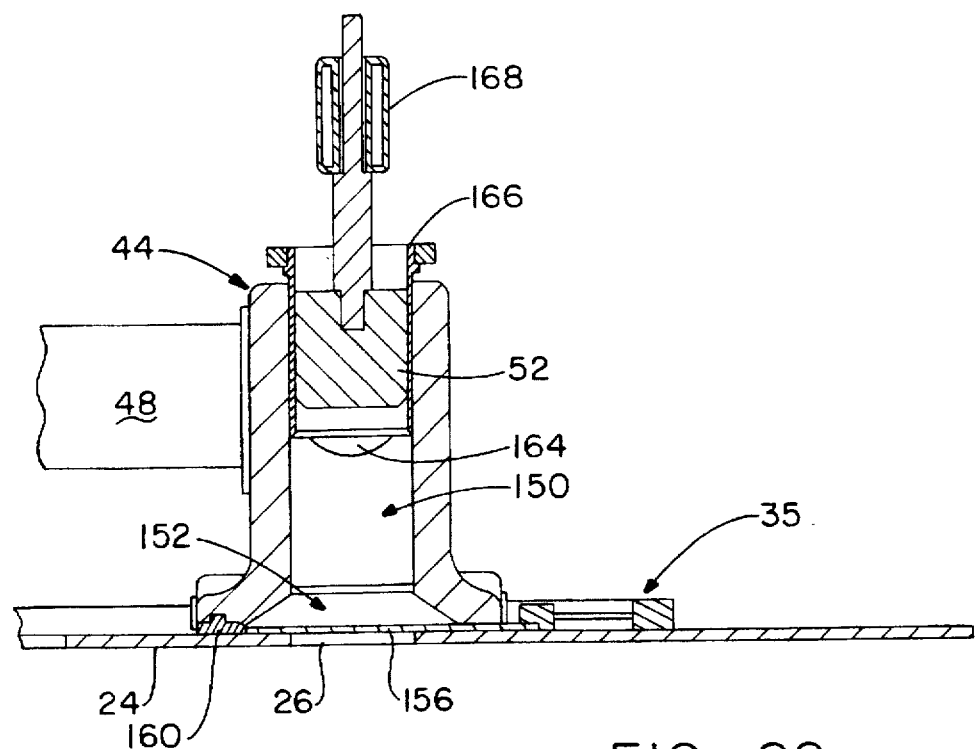
FIGS. 22–28 are partial cross-section views of the supply manifold, showing stages of a fill cycle in operation of the molding apparatus according to the preferred embodiment.

Turning now to FIG. 22, a further stage of operation of the fill cycle as shown, wherein the product plunger 52 is at its bottom of stroke within the supply manifold 44. After a predetermined pressure is applied by the plunger 52 or a predetermined pressure is applied for a given period of time, the plunger 52 will force formable material into the mold cavities 26 until they are completely filled in a uniform manner. Upon complete filling of the mold cavity 26, the mold plate knife assembly 35 is then actuated to move mold plate knife 156 from its open position to a closed position as shown in this figure. The forward edge of the mold plate knife 156 includes a knife edge which will cleanly sever the formable material at a point directly adjacent the top surface of the mold plate 24 in the vicinity of the cavities 26. At the same time, the mold plate knife 156 will seal space 152 to contain the formable material within the supply manifold 44. As the mold plate knife 156 moves to its closed position, it will also act in conjunction with the backup knife 160 to cleanly cut the formable material along the entire area of space 152 to completely seal the supply manifold 44 from the mold plate cavities 26 to thereby complete molding of the formable material within cavities 26. The backup knife 160 may thus also include a knife edge which cooperates with the knife edge formed on the mold plate knife 156 so as to properly perform this function. The backup knife 160 may be positioned within a groove formed in a lower portion of the supply manifold 44, and may be constructed to "float" to some degree in this position. Upon closing of the mold plate knife 156, the cooperative engagement of the knife edges formed on these members will fix the position of the backup knife 160 to facilitate proper severing of the formable material at the interface with the mold plate 24. In the operation where the mold plate knife 156 moves to its closed position as shown in FIG. 22, the sleeve valve 166 will remain in its sealing position with respect to the supply of formable material into the supply manifold 44, and the mold plate 24 will also preferably remain stationary during this process although the time necessary to close the mold plate knife 156 is very short.

Figure 23:
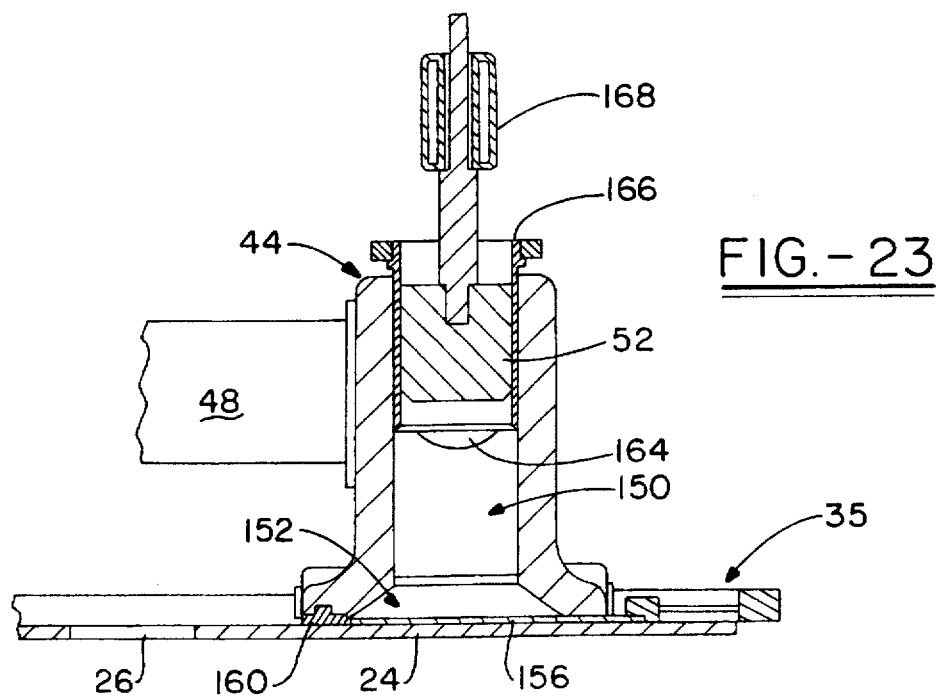

It should therefore be understood that once the mold plate knife 156 moves to its closed position to effectively seal off the supply manifold 44 from the mold plate cavities 26, it is then possible to relieve pressure on the pressure plate assembly 200, 100 as previously discussed, to thereby allow the mold plate 24 to be moved to a knockout position for the newly formed molded material within the cavities 26. In operation, the mold plate knife 156 moves to the closed position simultaneously with release of the clamping pressure and fill pressure to minimize the cycle time. This stage of the process is shown in FIG. 23. In this figure, the mold plate knife 156 remains in its closed position, and the sleeve valve 166 as well as product plunger 52 remains stationary. To allow the newly formed molded materials within cavities 26 to be removed, the mold plate 24 is moved to its knockout position as shown in FIG. 23, without movement of the mold plate 24 causing damage or otherwise affecting the molded material within cavities 26.

Figure 24:
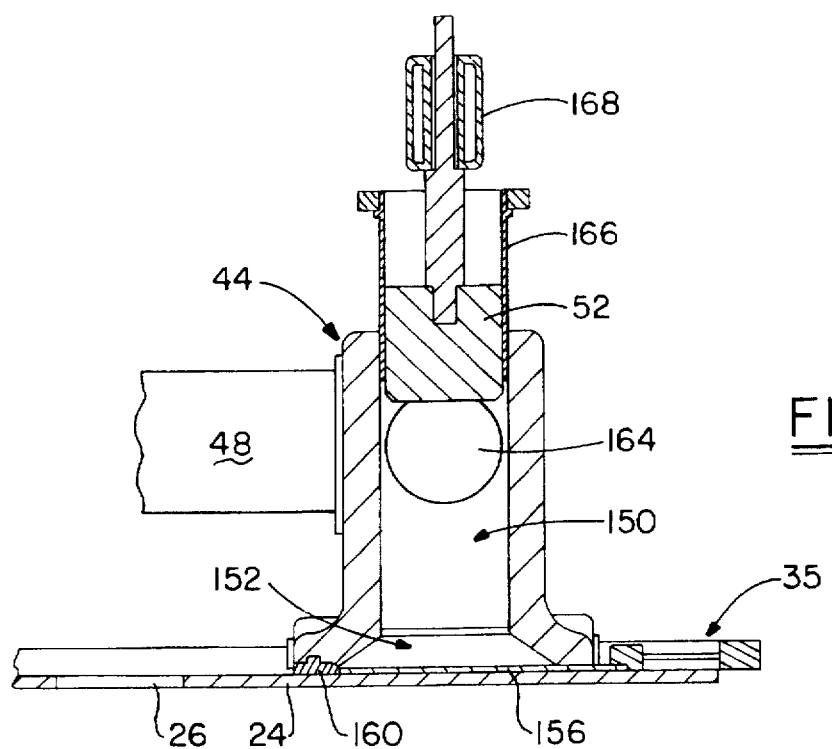
Figure 25:
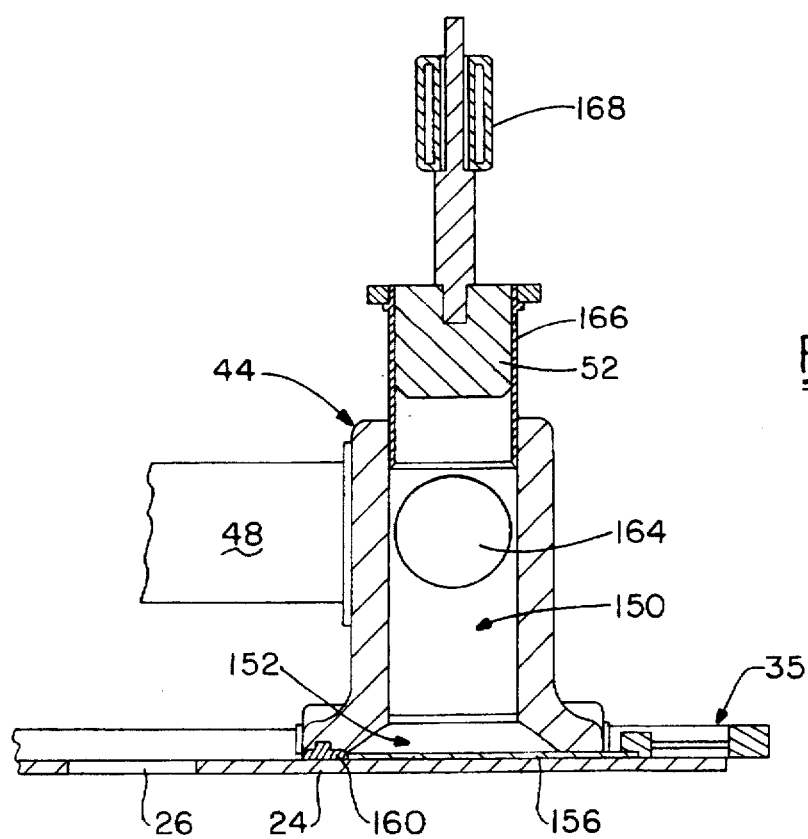

Thereafter, the knockout operation can be performed with respect to the filled cavities 26 while simultaneously causing the sleeve valve 166 to move to an open position as shown in FIG. 24. Movement of the sleeve valve 166 to its open position allows the formable material from the supply tubes 48 to again be introduced into the supply manifold 44 to refresh any material removed in the preceding fill cycle. Alternatively, the movement of the sleeve valve 166 may be set to allow refreshing of formable material after several filling cycles if desired, which may further reduce cycle times of the machine. The movement of sleeve valve 166 upwardly to its open position may also function to cause upward movement of the product plunger 52 to facilitate the refreshing of formable material within the chamber 150. Upon opening of the sleeve valve 166, the introduction of additional formable material into chamber 150 will urge the plunger 52 upwardly until the stage as shown in FIG. 25 is reached. Alternatively, the plungers 52 may be positively moved by a suitable drive mechanism. In FIG. 25, the plunger 52 has moved upwardly to the top of its stroke, while the sleeve valve 166 remains in its open position. At this stage, the mold plate knife 156 and mold plate 24 remain stationary in the positions shown until chamber 150 is refilled.

Figure 26:
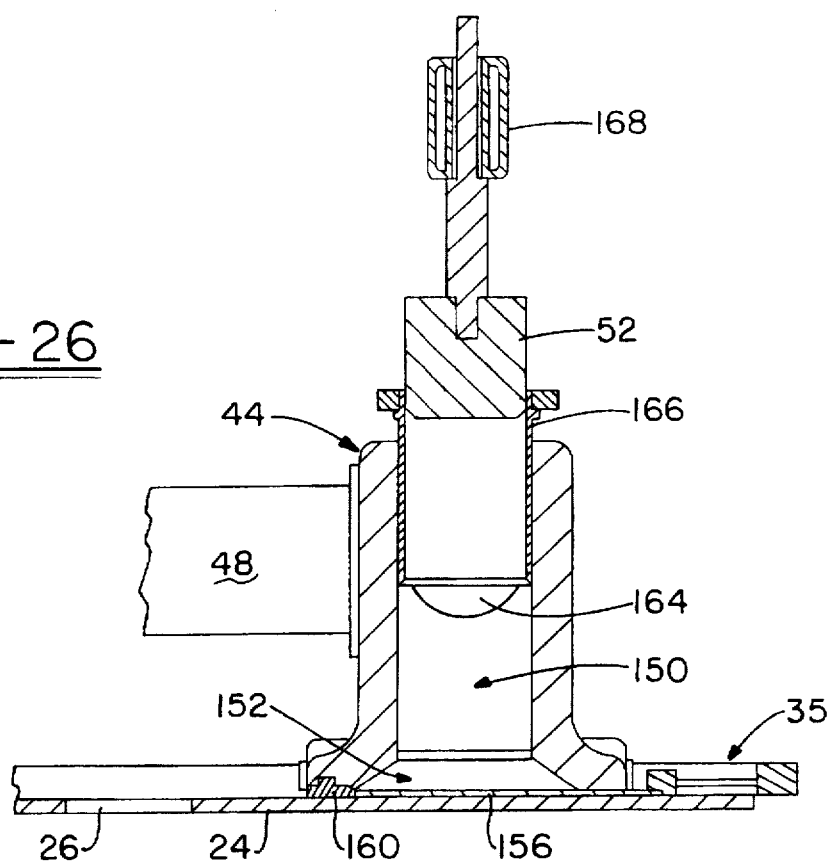
Figure 27:
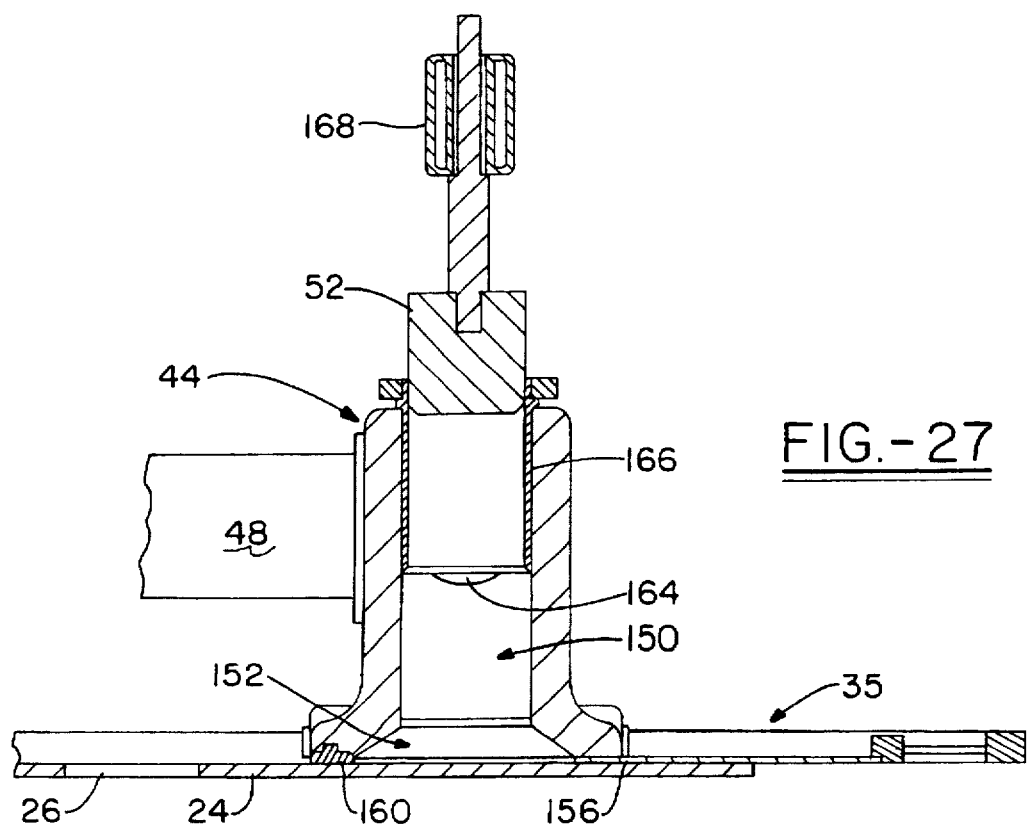
Figure 28:
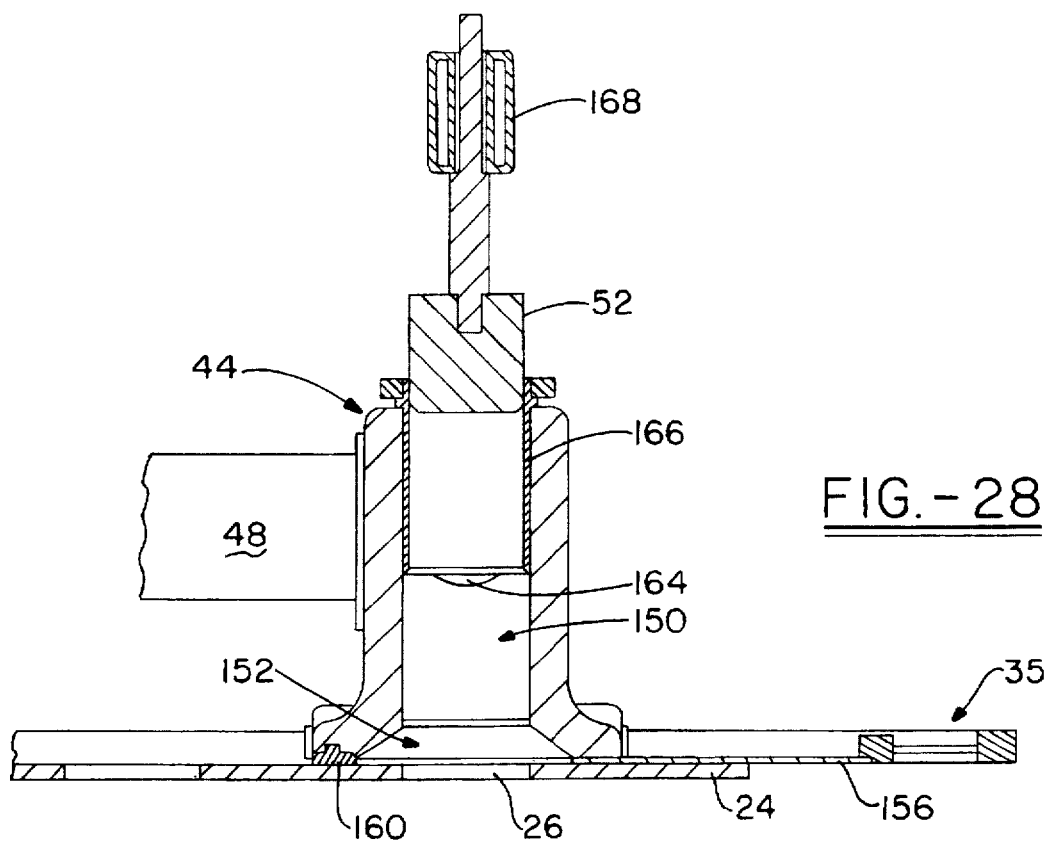

Subsequent to the step of recharging chamber 150 with formable material, a further fill cycle is initiated as shown in FIG. 26, with the sleeve valve 166 moving downwardly into chamber 150 to close off the opening 164 and the supply of material to chamber 150. The plunger 52 remains at the top of its stroke and the mold plate 24 and mold plate knife 156 remain stationary in the knock out and closed positions respectively as shown. Thereafter, the mold plate knife 156 is moved to its open position as shown in FIG. 27, with the mold plate 24, sleeve valve 166 and product plunger 52 remaining in the positions shown. The mold plate can then be moved such that cavities 26 are again in their fill position in communication with chamber 152 of supply manifold 44 as shown in FIG. 28. The movement of the mold plate 24 from fill to knockout positions is over a relatively short distance to increase speed of operation. Once the mold plate 24 is in this position, the product plunger 52 can again be moved downwardly in chamber 150 to urge material into the cavities 26 in a fill operation as shown in FIG. 20. This process is repeated for each of the fill heads 40 and 42 in successive fill and knockout cycles in opposed relationship to one another as previously described. It is also noted that the operations performed as described with respect to FIGS. 20–28 are carried out very rapidly, such that the fill and knockout cycles can be performed extremely fast, again increasing significantly the capacity of the apparatus 10.

Figure 29:
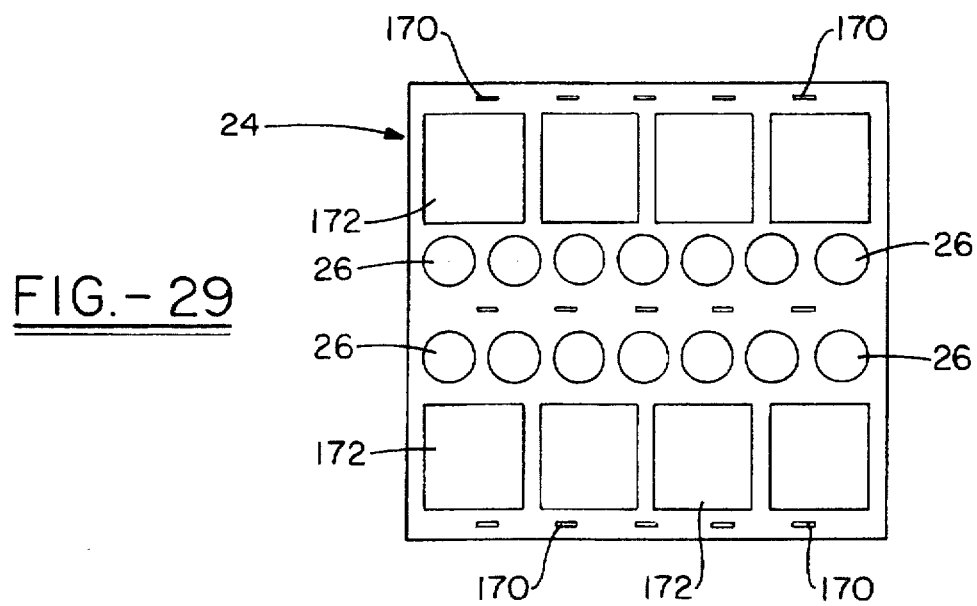
FIG. 29 shows a top plan view of the mold plate in a preferred embodiment.

Turning now to FIG. 29, a preferred embodiment of the mold plate 24 is shown. In this embodiment, the mold plate 24 is seen to have the two sets of cavities 26 as previously described. In addition, the mold plate 24 is formed with opposed sets of locating holes 170 adjacent two edges thereof and in the center region between the sets of cavities 26 which cooperate with locating pins (not shown) associated with the mold plate drive mechanism as previously described. The locating holes 170 allow simplified repositioning of the mold plate 24 in proper position should it require cleaning, maintenance or replacement. Further, it has been found that reducing friction between the mold plate 24 and other structures of the apparatus 10 during its reciprocal movement in operation facilitates increasing its useful life as well as increasing the speed of operation of the machine. The mold plate 24 is therefore preferably provided with relief grooves 172 to reduce friction upon movement of the mold plate 24. The relief grooves 172 are provided in the regions of the mold plate 24 adjacent the cavities 26 over majority of the surface area of the plate 26. The relief grooves 172 may be machined in plate 24 by any suitable machining process, and need only be several thousandths of an inch deep to significantly reduce frictional engagement of the plate 24. Alternatively, the grooves may be molded in the plate 24 if it is produced of a moldable material. Although a series of relief grooves 172 are shown, it should be recognized that a single, larger groove may be used or other configurations are possible.

Based upon the foregoing, it should be recognized that the molding machine of the invention provides a unique arrangement of components to allow relatively thin section members to be used while maintaining a desired relationship between the mold plate and a supply manifold from which formable materials are supplied to the mold cavities. The invention overcomes limitations with respect to the widths with which such members may be made, compensating for deflection of such members. The ability to increase the width of the machine greatly improves production capabilities in conjunction with the use of double-manifold or other fill arrangements. The use of a feed-through conveyor system allows the machine to be used integrally in a processing line, either preceding or following other processing steps, with the conveyor system being matched to that of other processing equipment. The arrangement and method of operation also provide gentle handling of the formable materials to maintain their integrity. The molding apparatus also allows each of the machine operations to be performed at a desired time relative to one another and independently of the overall cycle rate of the machine by means of a suitable control system. In the preferred embodiment for example, the drive mechanisms associated with the mold plate, mold plate knife, product plungers, sleeve valves, etc., are controlled independently of one another. This in turn allows sequential actuation of the functions comprising the fill and knock out cycles of the machine in a predetermined cycle independent of the overall production rate of the machine. The various functions performed during fill and knock out operations are thus preferably not mechanically interlocked, to eliminate forcing each function to remain proportional in duration and rate to the overall cycle rate as is common in prior art apparatus.

These and the other advantages and unique characteristics of the molding apparatus and method of forming food materials described with reference to the preferred embodiments provide a high capacity, efficient and versatile system which achieves precise forming of materials with uniform size and weight at higher capacity. The apparatus is versatile enough to be used in line along with other processing equipment, and as a molding machine or as a depositing machine as an example. The apparatus may be used with formable food products or other formable materials as desired. The foregoing description of preferred embodiments of the invention are merely examples, and the invention is not to be limited to the preferred embodiments, as many variations or modifications would be apparent to those skilled in the art based upon the principals of the invention as set forth herein. Such variations or modifications are contemplated within the scope of the invention as set forth in the appended claims.

What is claimed is:

1. A molding apparatus for processing formable materials, comprising:

at least one supply manifold for receiving a formable material therein, at least one mold plate having at least one mold cavity defining an area within said at least one mold plate, with said mold plate disposed adjacent said manifold to allow said at least one mold cavity to be selectively exposed to said formable material in said manifold, at least one plunger associated with said at least one supply manifold for applying pressure on said formable material in said manifold to fill said at least one mold cavity when said cavity is exposed to said formable material in said manifold, a clamp member positioned adjacent said mold plate, and a force applying mechanism to apply force on said clamp member to maintain said mold plate against said supply manifold, wherein said force applying mechanism applies pressure on said clamp member to maintain said clamp member against said supply manifold.

2. The molding apparatus of claim 1, wherein, said clamp member comprises a pressure plate assembly positioned adjacent said mold plate, said pressure plate assembly including a floating clamp plate and a pressure plate, said pressure plate including said force applying mechanism to positively clamp said clamp plate to said mold plate.

3. The molding apparatus of claim 1, further comprising, a mold plate drive for moving said mold plate at least between fill and discharge positions, and a knock-out mechanism to selectively remove said formable material from said at least one mold cavity, wherein said at least one cavity is exposed to said formable material within said at least one supply manifold in said fill position, and said formable material is removed from said at least one cavity by means of said knock-out mechanism when said mold plate is moved to said discharge position.

4. The molding apparatus of claim 1, wherein, said clamp member and said force applying mechanism allow the width of said clamp member to vary without a corresponding variance in the structural integrity of said clamp member, with any deflection of said clamp member being compensated for by said force applying mechanism.

5. The molding apparatus of claim 1, further comprising, a venting mechanism positioned in association with said mold plate to allow venting from said at least one mold cavity during filling of said at least one mold cavity with said formable material.

6. The molding apparatus of claim 1, wherein, said at least one supply manifold includes at least one opening for receiving said formable material, and a sleeve valve is provided in association with said at least one opening, with said sleeve valve being selectively positioned to close said at least one opening to stop the flow of formable material into said supply manifold.

7. The molding apparatus of claim 1, wherein, at least two supply manifolds for receiving a formable material therein are provided, each of said supply manifolds including at least one plunger for selectively applying pressure on said formable material in said manifold and wherein said mold plate includes at least two sets of mold cavities and each of said supply manifolds used to successively fill one of said sets of mold cavities of said mold plate.

8. The molding apparatus of claim 2, wherein, said force applying mechanism comprises at least one piston provided in said pressure plate and positioned relative to the base of said supply manifold so as to apply force on said clamp plate against said base of said supply manifold.

9. The molding apparatus of claim 1, further comprising, a mold plate knife assembly including at least one mold plate knife positioned adjacent said mold plate and a drive mechanism to selectively move said at least one mold plate knife between open and closed positions, wherein when said mold plate knife is in said open position, said at least one mold cavity is exposed to said formable material within said at least one supply manifold, and movement of said at least one mold plate knife to said closed position functions to cut said formable material at a position adjacent said mold plate.

10. The molding apparatus of claim 3, further comprising, a mold plate knife assembly including at least one mold plate knife positioned adjacent said mold plate and a drive mechanism to move said at least one mold plate knife from an open position to a closed position, wherein when said mold plate knife is in said open position, said mold plate is in said fill position such that said at least one mold cavity is exposed to said formable material within said at least one supply manifold to be filled, and movement of said at least one mold plate knife to said closed position functions to cut said formable material at a position adjacent said mold plate, wherein said mold plate is moved to said discharge position when said at least one mold plate knife is in said closed position.

11. The molding apparatus as in claim 9, wherein, said mold plate knife assembly further includes at least one backup knife which cooperates with said at least one mold plate knife to cut said formable material when said mold plate knife is moved to said closed position.

12. The molding apparatus of claim 7, further comprising, a mold plate knife assembly including at least two mold plate knives positioned adjacent said mold plate, with each of said at least two mold plate knives associated with one of said supply manifolds, and a drive mechanism to selectively move said at least two mold plate knives from an open position to a closed position with respect to said associated supply manifold, wherein when said respective mold plate knife is in said open position, said mold plate is in said fill position such that one of said sets of mold cavities is exposed to said formable material within said at least one supply manifold to be filled, and movement of said associated mold plate knife to said closed position functions to cut said formable material at a position adjacent said first surface of said mold plate, wherein said mold plate is moved to said discharge position when said at least one mold plate knife is in said closed position.

13. A molding apparatus for processing formable materials, comprising:

at least one supply manifold for receiving a formable material therein, a mold plate having at least one mold cavity defining an area within said mold plate, with said mold plate disposed adjacent said manifold to allow said at least one cavity to be selectively exposed to said formable material in said manifold, at least one plunger associated with said at least one supply manifold for selectively applying pressure on said formable material in said manifold to fill said at least one mold cavity when said cavity is exposed to said formable material in said manifold, a mold plate knife assembly including at least one mold plate knife positioned adjacent said mold plate and a drive mechanism to move said at least one mold plate knife from an open position to a closed position, wherein when said mold plate knife is in said open position, said mold plate is in a fill position such that said at least one mold cavity is selectively exposed to said formable material within said at least one supply manifold to be filled, and movement of said at least one mold plate knife to said closed position functions to cut said formable material at a position adjacent said first surface of said mold plate.

14. The molding apparatus as in claim 13, wherein, said mold plate knife assembly further includes at least one backup knife which cooperates with said at least one mold plate knife to cut said formable material when said mold plate knife is moved to said closed position.

15. The molding apparatus of claim 13, further comprising, a mold plate drive for moving said mold plate at least between fill and discharge positions, and a knock-out mechanism to remove said formable material from said at least one mold cavity, wherein said at least one cavity is exposed to said formable material within said at least one supply manifold in said fill position, and said formable material is removed from said at least one cavity by means of said knock-out mechanism when said mold plate is moved to said discharge position.

16. A method of molding formable materials comprising the steps of:

supplying a formable material into at least one supply manifold of a molding apparatus, providing a mold plate having at least one mold cavity, said mold plate being selectively positioned so the at least one mold cavity is exposed to the formable material within said at least one supply manifold, providing a mold plate knife assembly including at least one mold plate knife positioned adjacent said mold plate and a drive mechanism to selectively move said at least one mold plate knife from an open position to a closed position, positioning said at least one mold plate knife in said open position, such that said mold plate is in a fill position and said at least one mold cavity is exposed to said formable material within said at least one supply manifold to be filled, applying pressure on said formable material in said manifold to fill said at least one mold cavity exposed thereto, moving said at least one mold plate knife to said closed position to cut said formable material at a position adjacent a first surface of said mold plate.

17. The method of molding formable materials as in claim 16, further comprising the steps of:

positioning a clamp member adjacent a second surface of said mold plate, and applying pressure on said clamp member to substantially prevent deflection of said mold plate from a clamped position relative to said supply manifold when said mold plate is in said fill position;

relieving pressure applied on said clamp member to unclamp said mold plate from said supply manifold, and removing said formable material from said at least one mold cavity.

18. The method of molding formable materials as in claim 16, wherein, said step of supplying a formable material into a supply manifold includes selectively closing said supply manifold to said supply of formable material.

19. The method of molding formable materials as in claim 17, wherein, said mold plate is moved reciprocally from at least said fill position to a discharge position, wherein said at least one mold cavity is exposed to said formable material within said supply manifold in said fill position and said at least one mold plate knife is in said open position, and said step of removing said formable material from said at least one mold cavity is performed at said discharge position and said at least one mold plate knife is in said closed position.

20. The method of molding formable materials as in claim 17, wherein, said step of applying pressure on said clamp member includes providing a pressure plate in association with said clamp member, and providing said pressure plate with at least one piston, wherein said at least one piston applies force against said clamp member to force said clamp member against said supply manifold and to maintain said mold plate between said clamp member and said supply manifold.

* * * * *